(12) United States Patent
Toyofuku

(10) Patent No.: US 7,577,486 B2
(45) Date of Patent: Aug. 18, 2009

(54) QUALITY IMPROVEMENT SYSTEM

(75) Inventor: Tsuyoshi Toyofuku, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 288 days.

(21) Appl. No.: 10/848,152

(22) Filed: May 19, 2004

(65) Prior Publication Data

US 2005/0136559 A1 Jun. 23, 2005

(30) Foreign Application Priority Data

Dec. 22, 2003 (JP) ............................ 2003-425266

(51) Int. Cl.
*G06F 19/00* (2006.01)
*G06F 15/00* (2006.01)
*G06F 11/30* (2006.01)
*G06F 17/00* (2006.01)
*G06F 7/00* (2006.01)
*G21C 17/00* (2006.01)
*G06N 5/02* (2006.01)
*G06N 7/04* (2006.01)

(52) U.S. Cl. ...................... 700/110; 700/104; 702/185; 706/49; 706/54; 707/102; 707/104.1

(58) Field of Classification Search ......... 700/108–110, 700/121, 117, 49, 104; 702/182, 183, 35, 702/184, 185; 706/45, 46, 49, 50, 54, 59, 706/61; 707/100, 102, 104.1

See application file for complete search history.

(56) References Cited

U.S. PATENT DOCUMENTS

| 6,240,329 | B1 * | 5/2001  | Sun            | 700/110 |
| 6,741,941 | B2 * | 5/2004  | Obara et al.   | 702/35  |
| 6,847,917 | B2 * | 1/2005  | Bechhoefer     | 702/183 |
| 6,859,676 | B1 * | 2/2005  | Kazemi         | 700/110 |
| 6,931,387 | B1 * | 8/2005  | Wong et al.    | 706/50  |
| 7,065,566 | B2 * | 6/2006  | Menard et al.  | 709/223 |
| 7,130,709 | B2 * | 10/2006 | Popp et al.    | 700/122 |
| 7,490,085 | B2 * | 2/2009  | Walker et al.  | 707/10  |

FOREIGN PATENT DOCUMENTS

| JP | 05-035745  | 2/1993 |
| JP | 05-143342  | 6/1993 |
| JP | 2002-149221 | 5/2002 |

* cited by examiner

*Primary Examiner*—Crystal J Barnes-Bullock
(74) *Attorney, Agent, or Firm*—Staas & Halsey LLP

(57) ABSTRACT

A quality improvement system, which automatically performs engineering analysis and problem coping to improve the quality of semiconductor products. The quality improvement system is connected to a plurality of external databases, which store semiconductor product quality information acquired in a plurality of manufacturing processes, and a client server, which is operated by an engineer. The quality improvement system receives quality information from the external databases, receives engineer comments from the client server and associates the quality information and comments and stores them in a knowledge database.

19 Claims, 18 Drawing Sheets

| LOTNO | Process day | Major process | Minor process | Processing device | Large process inspection | Small process inspection | WFNO | Defect Count |
|---|---|---|---|---|---|---|---|---|
| aaaaaaa-aa | 2003/1/1 | step-A | step-a1 | SOUIT1 | step-B | step-b1 | 20 | 3 |
| aaaaaaa-aa | 2003/1/1 | step-A | step-a1 | SOUIT1 | step-B | step-b1 | 5 | 4 |
| aaaaaaa-aa | 2003/1/1 | step-A | step-a1 | SOUIT1 | step-B | step-b2 | 20 | 39 |
| aaaaaaa-aa | 2003/1/1 | step-A | step-a1 | SOUIT1 | step-B | step-b2 | 5 | 63 |

| LOTNO | Processing day | Major process | Minor process | processing device | WFNO | Defect Count | Processing device | Device maintenance |
|---|---|---|---|---|---|---|---|---|
| aaaaaaa-aa | 2002/11/9 | step-A | step-a1 | SOUIT1 | 20 | 2 | | |
| aaaaaaa-aa | 2002/11/9 | step-A | step-a1 | SOUIT1 | 5 | 3 | | |
| aaaaaaa-aa | 2002/11/10 | step-A | step-a1 | SOUIT1 | 20 | 4 | | |
| aaaaaaa-aa | 2002/11/10 | step-A | step-a1 | SOUIT1 | 5 | 5 | | |
| | 2002/11/11 | | | | | | SOUIT1 | P1LD Hardware |
| | 2002/11/12 | | | | | | SOUIT1 | P1LD Hardware |

Fig.20 (Prior Art)

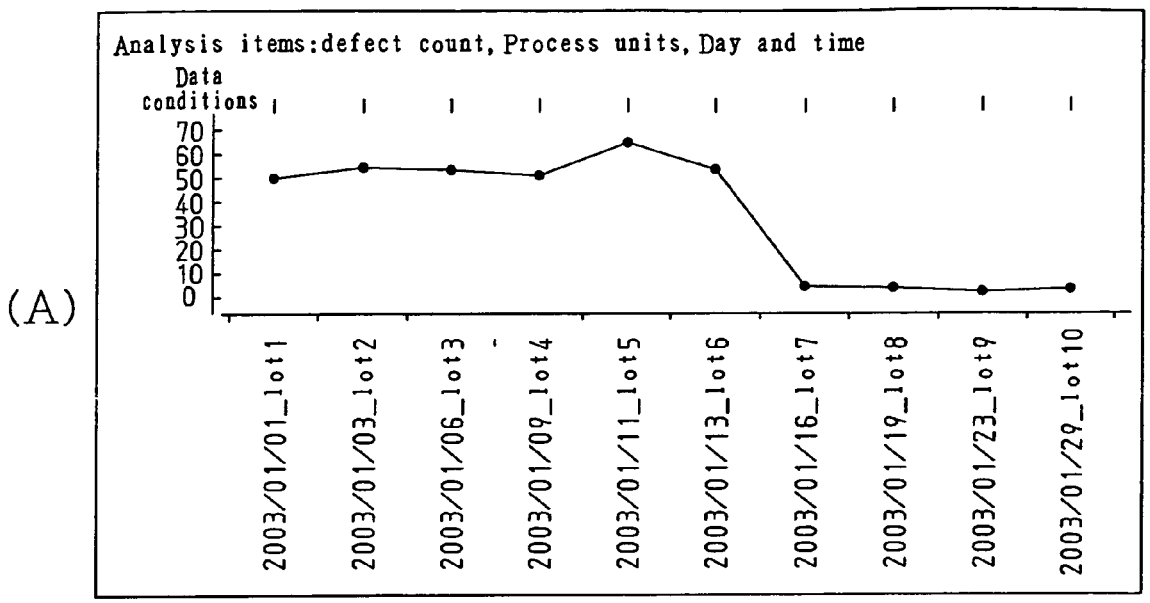

(A) Analysis items:defect count, Process units, Day and time (B) History

| LOTNO | Process | Processing device | Time |
|---|---|---|---|
| lot1 | ProcessA | DeviceA | 2003/01/01 |
| lot2 | ProcessA | DeviceB | 2003/01/03 |
| lot3 | ProcessA | DeviceB | 2003/01/06 |
| lot4 | ProcessA | DeviceA | 2003/01/09 |
| lot5 | ProcessA | DeviceB | 2003/01/11 |
| lot6 | ProcessA | DeviceA | 2003/01/13 |
| lot7 | ProcessA | DeviceB | 2003/01/16 |
| lot8 | ProcessA | DeviceA | 2003/01/19 |
| lot9 | ProcessA | DeviceA | 2003/01/23 |
| lot10 | ProcessA | DeviceB | 2003/01/29 |

(C) Maintenance history

| Device | Time | Maintenance history |
|---|---|---|
| DeviceA | 2002/12/01 | Vacuum anomaly |
| DeviceA | 2002/12/14 | Running error |
| DeviceB | 2003/01/01 | Current anomaly |
| DeviceA | 2003/01/07 | Current anomaly |
| DeviceA | 2003/01/13 | Running error |
| DeviceB | 2003/01/09 | Discharge |
| DeviceA | 2003/01/15 | Periodic maintenance |
| DeviceB | 2003/01/20 | Vacuum anomaly |
| DeviceA | 2003/01/30 | Discharge |

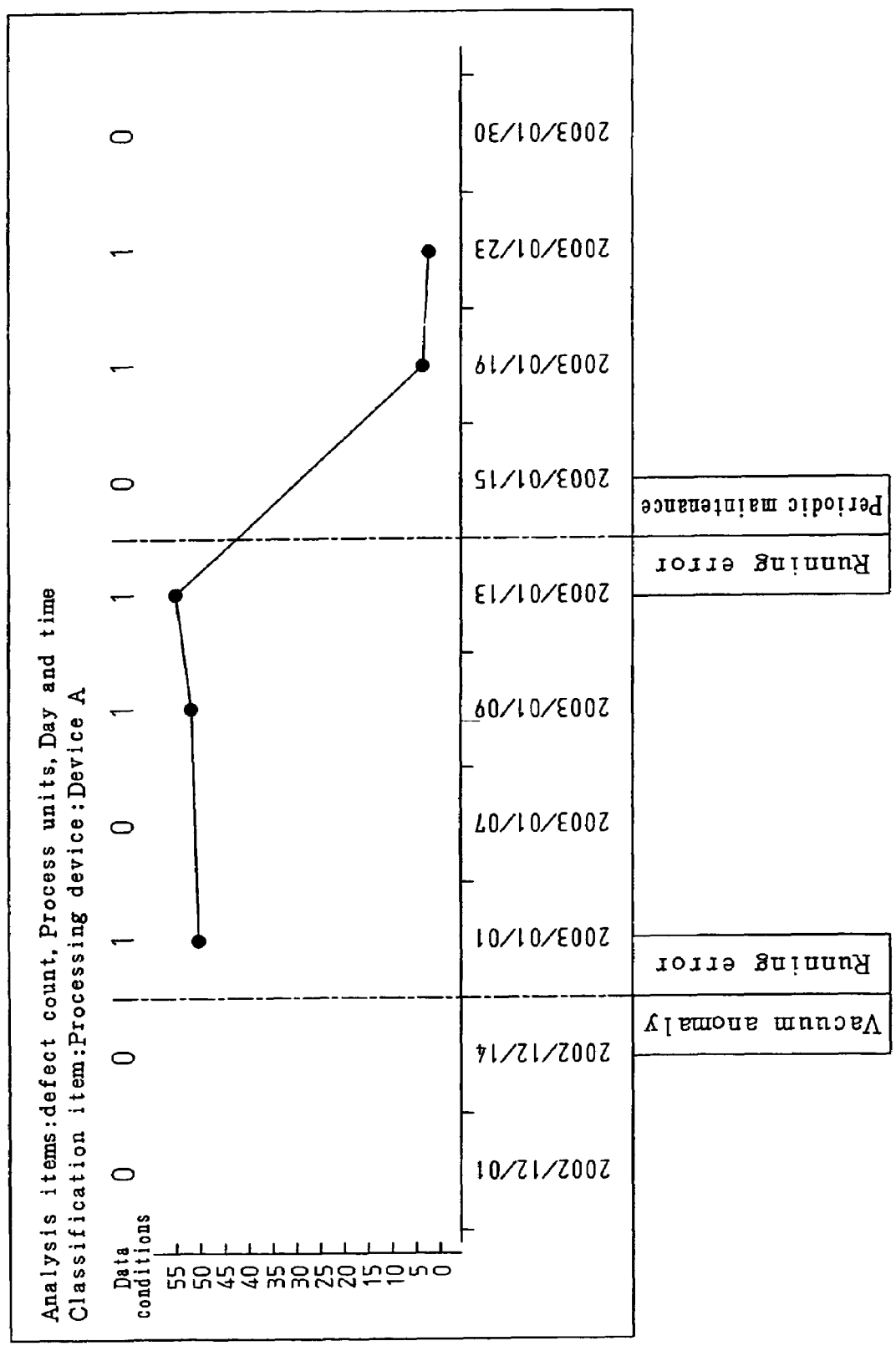

QUALITY IMPROVEMENT SYSTEM

CROSS-REFERENCE TO RELATED APPLICATIONS

This application is based upon and claims the benefit of priority from the prior Japanese Patent Application No. 2003-425266, filed on Dec. 22, 2003, the entire contents of which are incorporated herein by reference.

BACKGROUND OF THE INVENTION

The present invention relates to a quality improvement system for performing processes to improve quality using various types of quality data obtained in semiconductor manufacturing processes.

In recent years there has been an increase in the number of manufacturing processes for semiconductors, and manufacturing process technologies have become increasingly complicated. When performing data analysis for quality improvement of semiconductor products or to improve semiconductor manufacturing processes, conventional analysis systems require lengthy processing times. Furthermore, engineers must master the analysis system in order to be able to perform efficient analysis. That is, the knowledge for improving the quality of semiconductor products or improving semiconductor manufacturing processes is solely vested with each engineer, and the effectiveness of the analysis system is dependent on the engineers (operators). An analysis system enabling the use of analytical techniques while allowing knowledge input by the engineers is necessary in order to accelerate quality improvement.

Conventionally, in improving semiconductor manufacturing processes, the items (quality data) to be analyzed has been standardized and the analytical techniques relating to the data has been systematized in each process or responsible section. In improving the quality of semiconductor products, the analytical techniques and proper use of the system must be integrated for each of these processes. In practice, the analytical techniques and proper use of the system integrated for each of these processes is determined by the engineers.

SUMMARY OF THE INVENTION

One aspect of the present invention is a quality improvement system, connected to an input device and external databases for storing quality data, obtained through manufacturing processes. The quality improvement system has a knowledge processing device including a storage device for storing analysis procedure information. A data processing device acquires analysis subject data from the plurality of external databases according to the analysis procedure, analyzes the analysis subject, and generates an analysis result. The knowledge processing device is operable for appending reference information input from the input device to the analysis result. Further, the knowledge processing device is operable for determining the level of importance of the reference information and extracting suitable analysis procedure information in accordance with the level of importance from the storage device.

A further aspect of the present invention is a method for improving the quality of a semiconductor product manufactured in a plurality of semiconductor product manufacturing processes. The method includes storing quality data for the semiconductor product obtained during the plurality of semiconductor manufacturing processes in each of a plurality of external databases, having a knowledge server including a program for analyzing the quality data cause an application server to acquire quality data from the external databases and analyze the quality data in accordance with the program, storing reference information appended to the analysis result generated by the application server in the repository database with the knowledge server, and self-learning by referring to the repository database with the knowledge server.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 20 is a diagram showing data analysis in a conventional system;

FIG. 21 is a diagram showing data analysis in a preferred embodiment of the present invention;

DESCRIPTION OF THE PREFERRED EMBODIMENTS

Figure 1:
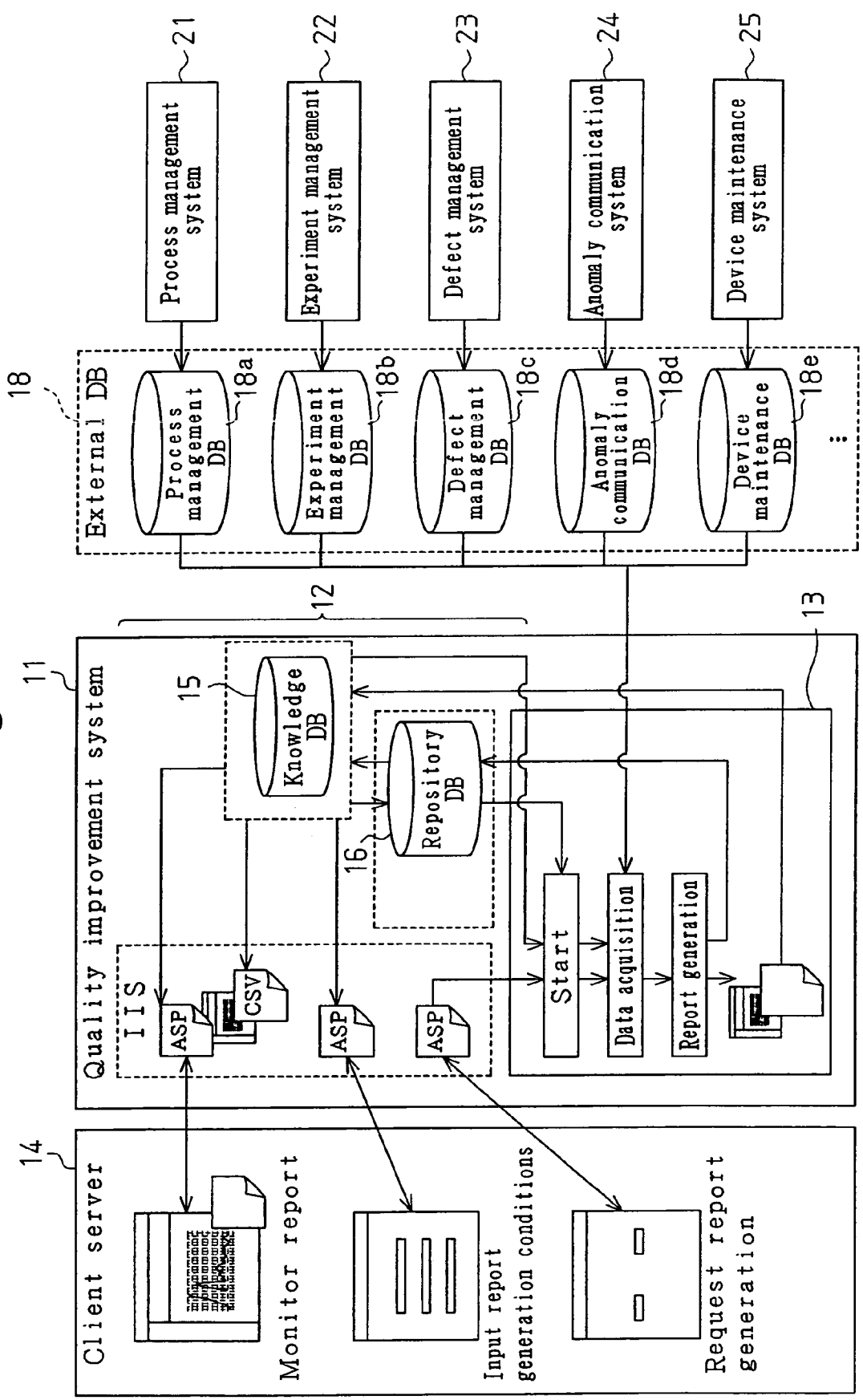
FIG. 1 is a schematic structural diagram showing a quality improvement system according to a preferred embodiment of the present invention.

Systems utilizing partial automation of data analysis, optimization of equipment installation layouts, and accumulation of knowledge have been disclosed as conventional art for quality improvement.

For example, in the data analysis system disclosed in Japanese Laid-Open Patent Publication No. 5-35745, a series of data (analysis data, device maintenance data) related to processes or products, which have produced anomalous inspection results, are output based on the date. The application of this analysis system is strictly limited to fields that inspect for defects. Furthermore, although this analysis system has a function for extracting data, it is not capable of using, analyzing, or considering the extracted data. Accordingly, the use, analysis, and consideration of the data are left to the engineers to deal with.

The automatic quality control device disclosed in Japanese Laid-Open Patent Publication No. 2002-149221 collects the processing conditions and processing results of the processing device, and performs simulations to determine the optimum processing conditions. This control device determines the optimum processing conditions from the relatedness between the processing conditions and processing results in a single process, but does not determine the processing conditions of the processing device based on optimum product performance, that is, product experiments. Thus, analysis for optimum improvement of product quality requires the consideration and judgment of engineers.

The knowledge processing system disclosed in Japanese Laid-Open Patent Application No. 5-143342 is a specialized system for knowledge management, and is related to algorithms for adding new knowledge to previously recorded knowledge. It is not a system which is capable of using analytical techniques in conjunction with the considerations and analytical methods of engineers.

Technology for macro-generation of analytical techniques (analysis flow) for each engineer is also known in the prior art. In analysis flow macro generation, a user extracts data, compartmentalizes the work of processing and graphics, and combines the compartmentalized processes to prepare the analysis flow. However, the preparation of analysis flow is performed by the user, and analysis flow prepared by an expert user is only then put to practical use secondhand by another user.

In a conventional quality improvement system, a management system which manages information (quality data) obtained in the manufacturing processes is independent from the information processing system which analyzes data along with quality improvement conducted by engineers. Furthermore, although the information processing system performs various analyses, such as defect data analysis, yield analysis and the like, system functions for separate objective analyses are narrow and dispersed. That is, the workflow cannot be systematically realized in conjunction with the considerations of the engineers when conducting quality improvement. Accordingly, the effectiveness of the conventional quality improvement system depends on the user (engineer), and only supports the work of the user.

In another conventional system that accumulates experiential knowledge of the engineers related to quality improvement, the history of problems, technical reports, and the like are managed in electronic databases. In this system, one must perform keyword searches to effectively use the experiential knowledge of the engineers. That is, this system also only supports the work of the user.

A quality improvement system according to a preferred embodiment of the present invention will now be described hereinafter with reference to the drawings.

Unlike to said conventional systems, as shown in FIG. 1, a quality improvement system 11 connects a knowledge server (i.e., a knowledge use processing device) 12 and a client server (i.e., an input device) 14 operated by an engineer through a network (e.g., the Internet). The knowledge server 12 is a computer functioning as a web/APP server and including an application server (i.e., a data processing device) 13. Furthermore, the knowledge server 12 is also connected to external databases 18.

The knowledge server 12 includes a knowledge database (i.e., a storage device) 15 and a repository database 16. Furthermore, the knowledge database 12 functions as an Internet information server (TIS) and generates ASP-format web pages and CSV-format data by the operation of web applications. An engineer monitors reports, inputs report preparation criteria, and executes report preparation requests by accessing web pages from the client server 14.

Analysis programs and problem coping programs are included in the application server 13. The application server 13 executes various processes relating to quality improvement in accordance with these programs. Each program stored in the application server 13 is started in accordance with a report preparation request by an engineer or is periodically started by a task manager of the knowledge server 12. The application server 13 receives report preparation information from a repository DB 16 of the knowledge server 12 and acquires processing objective data from the external databases 18. The application server 13 prepares reports for quality improvement based on the acquired information and data. The application server 13 stores prepared reports in a knowledge DB 15 and records the report preparation information in a repository DB 16.

The external databases 18 include a process management DB 18a, an experiment management DB 18b, a defect management DB 18c, an anomaly communication DB 18d, and a device maintenance DB 18e. The DB 18a through DB 18e are respectively connected to management systems for managing the accumulated data (a process management system 21, an experiment management system 22, a defect management system 23, an anomaly communication system 24, and a device maintenance system 25).

The process management system 21 is used to check whether or not management data is changing within a predetermined range set by an upper limit value and a lower limit value by the operator engaged in process management work. The experiment management system 22 is used to monitor experiment information, such as the defect rate of a plurality of chips formed on wafers, by an operator engaged in experiment management work. The defect management system 23 is used to manage the presence of defects in a chip, the number of defects and defect modes when an operator engaged in defect management work monitors the layout of the circuit pattern formed on each chip. The anomaly communication system 24 is used by an operator to input comments concerning abnormalities when an anomalous operation occurs or a device stops due to device problems and process problems (such as, temperature anomaly and wafer cracking) during a process. The device maintenance system 35 is used by the operator to monitor the occurrence of sudden problems and problems which occur at periodic inspections of the device.

When anomalies occur, such as when problems and alarms are detected in any of the systems 21 through 25, the operator in charge of the work informs an engineer of the anomaly. The engineer operates the client server 14 to access the quality improvement system 11 and perform measures to eliminate the anomaly. The measures taken, that is, the quality improvement methods performed by the engineer, are stored in the knowledge DB 15.

Figure 2:
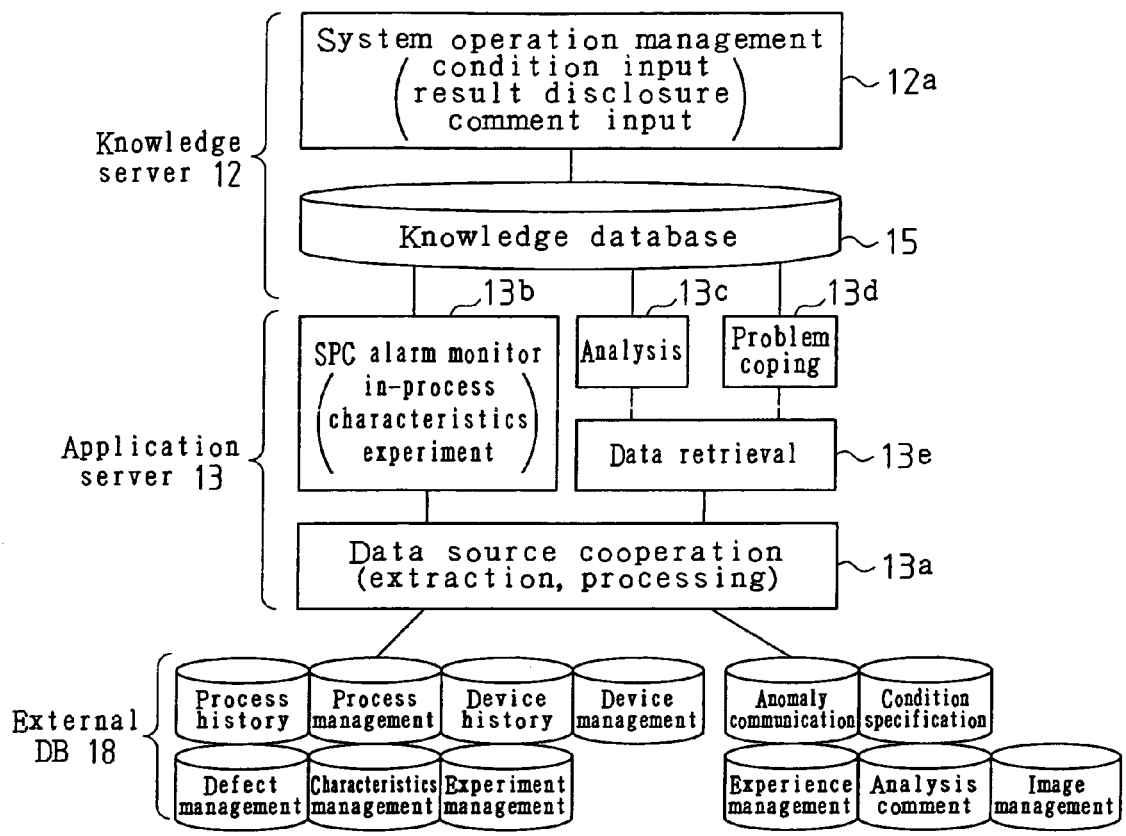
FIG. 2 is a conceptual diagram showing each function.

The functions of the knowledge server 12 and application server 13 will be described below with reference to FIG. 2.

The knowledge server 12 has a group management function 12a for classifying system users for each type of analysis and each type of technology, and builds a knowledge database (DB) 15 through self-learning. The knowledge server 12 manages the reception of analysis condition input, analysis result disclosure, and comment input for analysis results for each user group, and stores accumulated knowledge, which includes application server processing results and engineer comments, in the knowledge DB 15. In this way, the knowledge server 12 performs self-learning of analysis methods and the techniques used to cope with problems.

The application server 13 is connected to a plurality of external databases 18. The plurality of external databases 18 are divided into numerical databases for storing numerical data related to process history, process management, device history, device management, defect management, characteristics management, and experiment management, and event databases for storing data (document data and image data) related to anomaly communications, condition specifications, experiment management, analysis comments, and image management.

The application server 13 acquires data required for processing from the databases 18, and executes a data source cooperation process statistical process control (SPC) alarm monitoring process 13b, a data analysis process 13c, a problem coping process 13d, and a data retrieval process (data source cooperation) 13e. In the data source cooperation process (function 13a), data extraction and manufacture processing are executed. In the SPC alarm monitoring process (function 13b), in-process manufacturing parameters (parameters, such as thickness, length, resistance and the like), characteristics such as electric current and voltage characteristics and the like, and whether or not the experiment results of circuit operation are within a predetermined standard range are monitored. In the data analysis process (function 13c), analysis processes corresponding to user input conditions are executed. In the problem coping process (function 13d), processes are executed for abnormalities determined in the SPC alarm monitoring process. In the data retrieval process (function 13e), data required for the data analysis process and problem coping process are retrieved. Processing results in the application server 13 are stored in the knowledge database 15 of the knowledge server 12.

Figure 3:
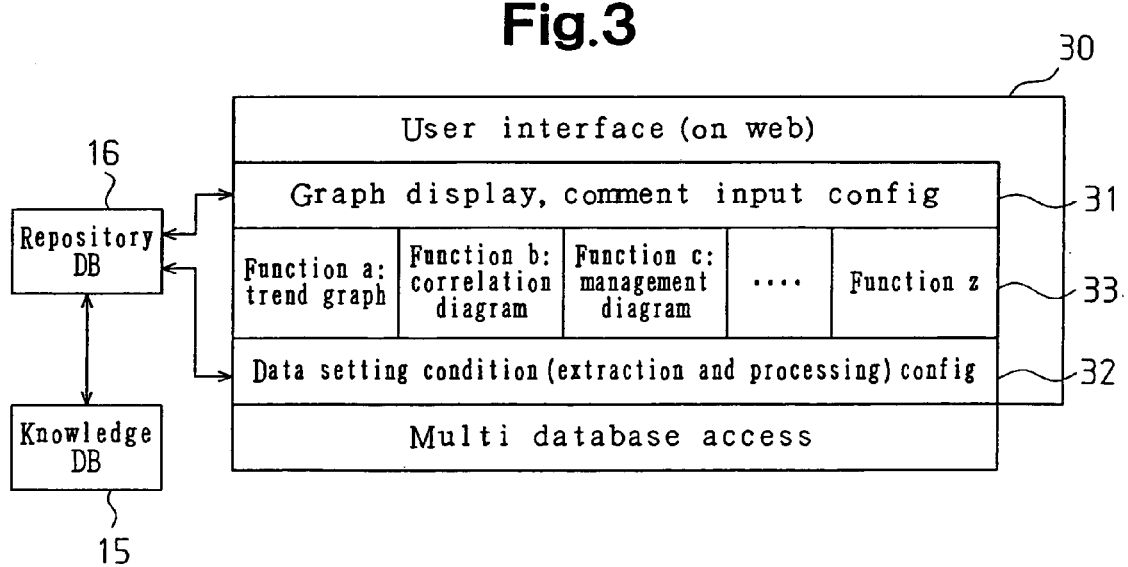
FIG. 3 illustrates the repository function in the knowledge server.

The repository function of the knowledge server 12 is described below with reference to FIG. 3.

In the quality improvement system 11, a graphic display and comment input setting function (config function) 31 and a data condition (data extraction and processing) setting function (config function) 32 are provided by means of a web-based user interface 30. Furthermore, in the quality improvement system 11, templates 33 for various types of analysis functions a through z, such as trend diagrams, correlation diagrams, management diagrams and the like, are provided. Whatever template 33 is used to perform analysis, the settings are accomplished by the graphic display setting function.

Specifically, an engineer operates the client server 14 to access each setting screen provided over the web, and inputs in a batch the analysis conditions and result comments. At this time, the various data input in each setting screen are stored in the repository DB 16 as definition files (config files) representing the analysis procedures.

The repository DB 16 group manages each config function 31 and 32 for each technology. That is, the repository DB 16 manages the information input by the engineer regarding analysis conditions, and the analysis results and comments related therewith for each technology group.

More specifically, the engineer who prepares the analysis procedure config file inputs comments related to the analysis result. Another engineer (advisor) associated with the same group as the first engineer, in addition to being able to secondarily use the config file, can also add comments on the analysis result to the config file. The users who can use the config file are restricted by the repository technology. Analysis result comments of the engineer who prepared the config file and the advisor are managed separately. The opinions of the engineer who prepared the config file are managed so as to be linked to the opinions of a plurality of other engineers (advisors). The repository DB 16 automatically analyzes input comments in word units, and manages the frequency of usage of each term, and the order (association of each comment) of the comment postscript.

The engineer defines the optional workflow (analysis procedure) corresponding to the analysis subjective by means of the two config functions 31 and 32, so as to be capable of disclosing analysis results and collecting the opinions of other engineers in the associated departments.

The method for preparing the workflow (analysis procedure) using the data condition setting config function 32 is described below.

Figure 4:
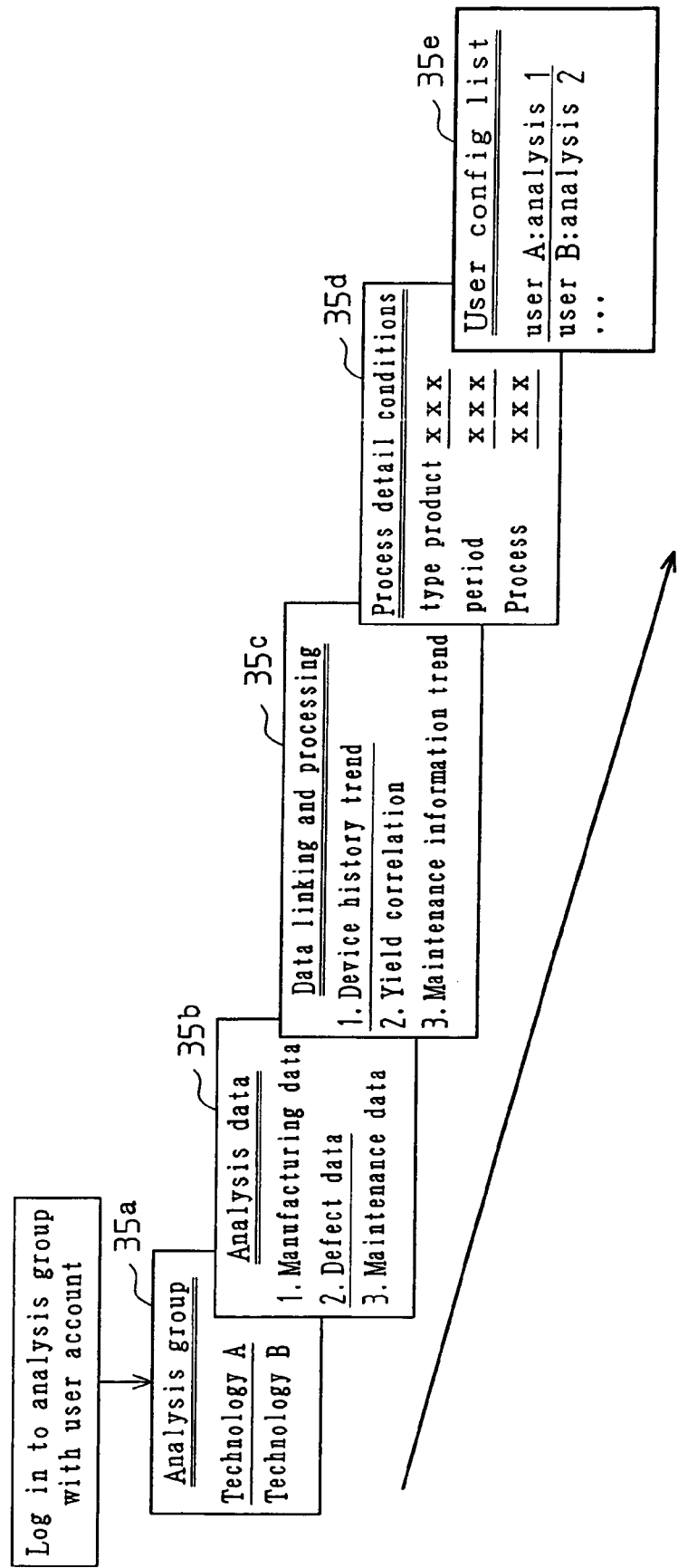
FIG. 4 illustrates a workflow defining method.

As shown in FIG. 4, the setting screens 35a through 35e are displayed by the drill down method, and various types of analysis condition is set on the various screens, to register the corresponding analysis procedure in the definition list (config list).

Specifically, the engineer operates the client server 14 to access the analysis group page disclosed on the web, and logs on to a predetermined user account. The engineer performs analysis group selection, analysis data selection, data linking and process selection, and detailed processing conditions in the setting screens 35a through 35e. Then, the analysis procedure corresponding to the selected information is displayed in a list on the client server 14 for each user.

In this way, a definition file (config file) including information for the analysis procedure is prepared by the navigation function sequentially displayed in the drill down method of the analysis conditions setting screens 35a through 35e, and the definition file is stored in the repository DB 16. The definition file includes condition setting input information and analysis subjective comment information. The application server 13 executes a predetermined analysis process in accordance with the analysis conditions of the definition file.

Figure 5:
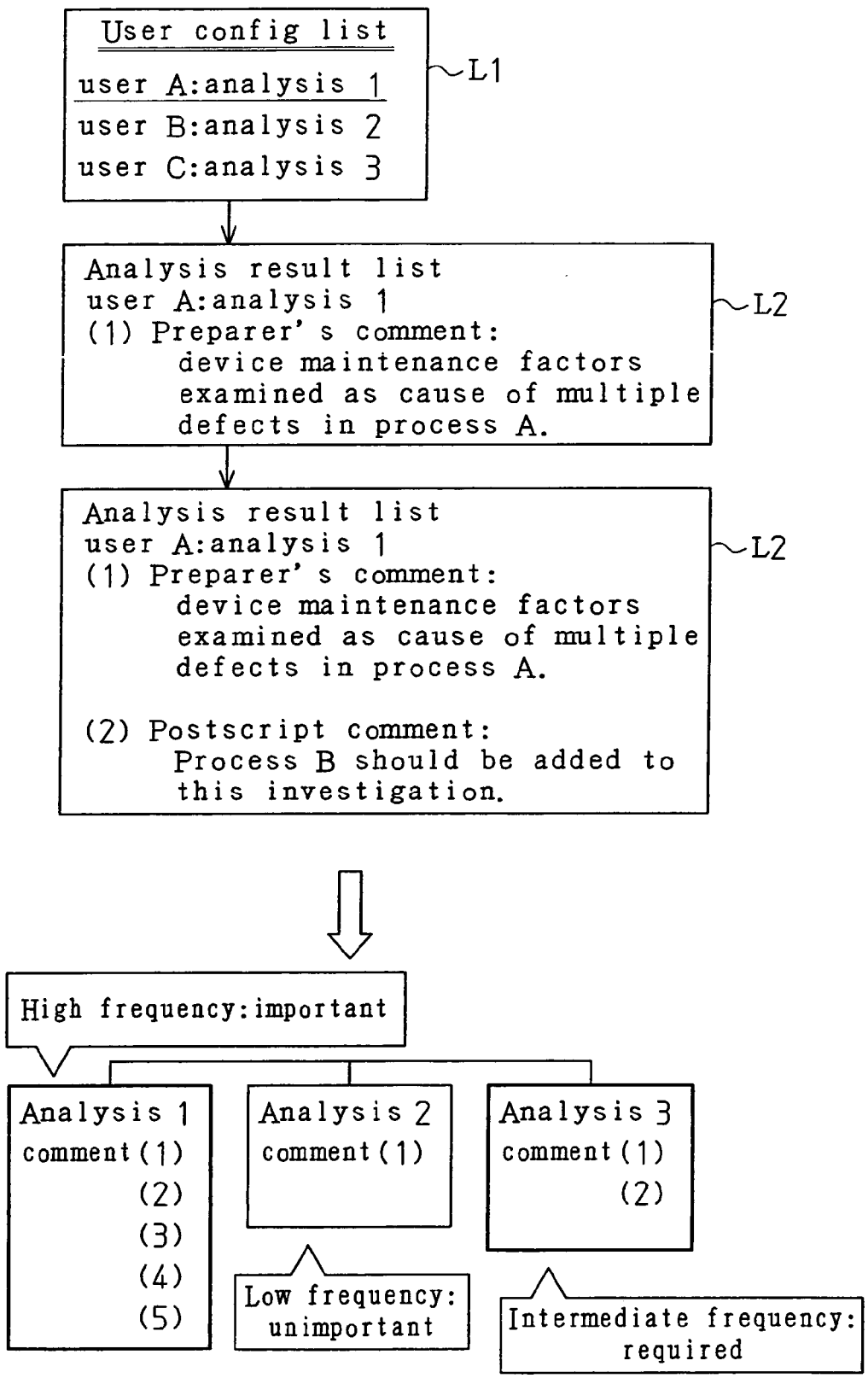
FIG. 5 illustrates a comment input.

As shown in FIG. 5, when a predetermined analysis procedure registered in the definition list (config list) L1 is selected, an analysis result list L2 corresponding to the selected analysis procedure is displayed. Analysis objective comments input by the engineer (worker), when the analysis procedure was registered, are input to the analysis result list L2. The analysis graph is displayed with the analysis result list L2 in another screen. A plurality of engineers in associated departments can determine the suitability of the analysis result while referring to the graph. Then, other engineers may add comments to the analysis result list L2 as a generated document. The knowledge server 12 determines the importance of each definition file and determines the prioritized order of the definition files based on the frequency of written comments by other engineers.

In this way, the comments of a plurality of associated engineers can be added to the analysis result comments of a single engineer in the quality improvement system 11. The knowledge server 12 builds the knowledge DB5 through self-learning based on the frequency of written comments. Therefore, the advantages obtained are similar to those of a neural network and synapses. Furthermore, in the knowledge DB 15, it is possible to retrieve the definition file of an analysis procedure in accordance with the association of the ideas of a plurality of engineers by managing the writing procedure (associations), in addition to the frequency of written comments. A score may be appended to the analysis result as information related to the effectiveness of the analysis result. In this case, the prioritized order when displaying the lists of analysis procedure definition files may be determined based on the score.

Figure 6:
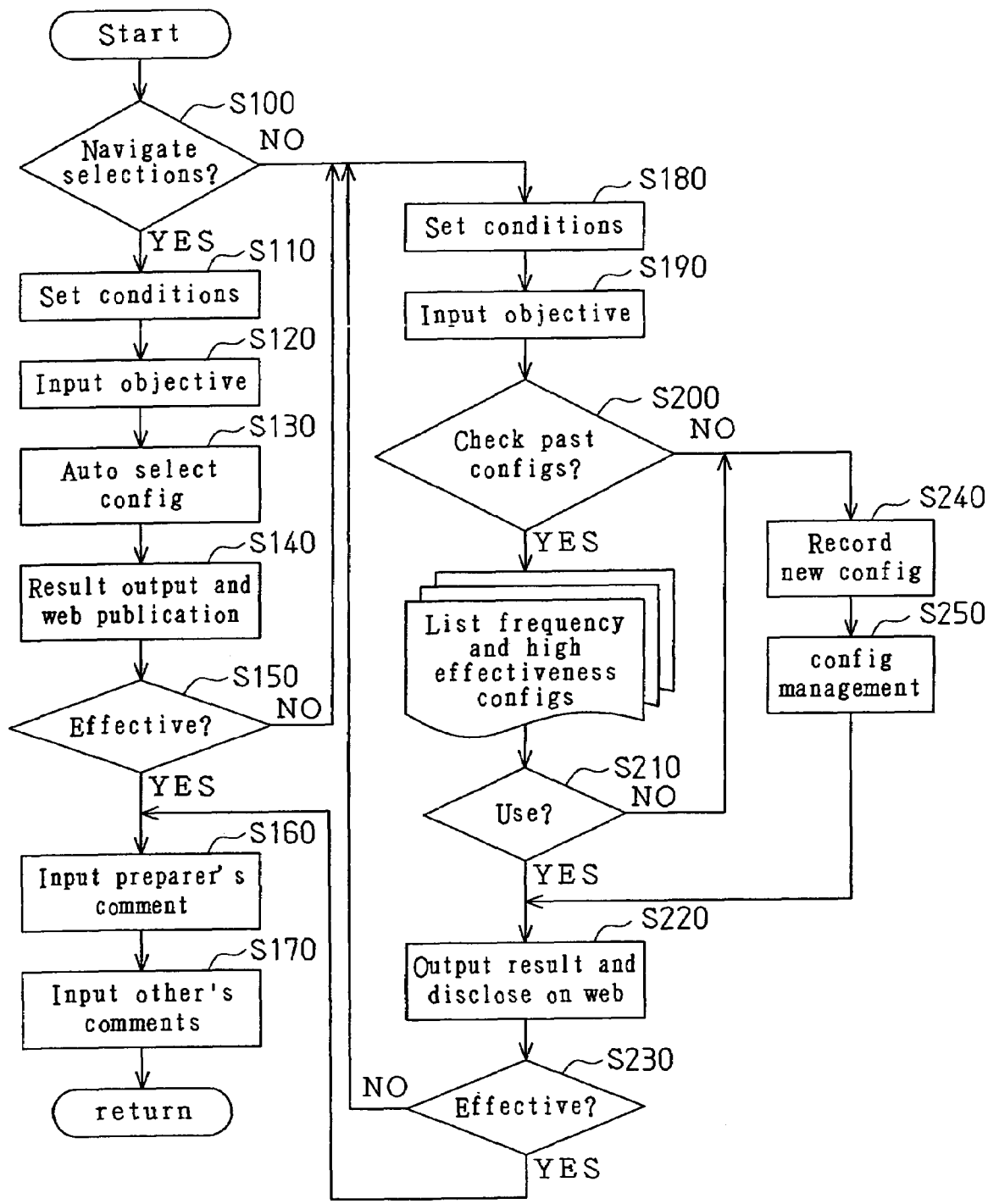
FIG. 6 is a flowchart showing an analysis process.

The operation of the quality improvement system 11 in the preferred embodiment of the present invention will now be described with reference to FIGS. 6 and 7.

First, the analysis process of FIG. 6 will be described. This process starts when an engineer operates the client server 14 to access the main menu for the system 11 disclosed on the web and selects the items of data analysis.

In step S100, the knowledge server 12 determines whether or not an engineer has selected the navigation function. When the navigation function has been selected (YES), then in step S110, the knowledge server 12 sends page data for the analysis condition setting screen to the client server 14, which displays this screen (refer to FIG. 4). The knowledge server 12 receives the data for each item (product type, data type, units (per wafer, per lot, per device and the like)) of the analysis conditions set on the setting screen. In step S120, the knowledge server 12 transmits the input screen page data for analysis subject comment input to the client server 14, which displays this screen, and receives the analysis subject (document data) input on the input screen.

In step S130, the knowledge server 12 checks the definition files (config files) stored in the knowledge DB 15 for files with a matching objective and the set conditions, and automatically selects a specific config file from the result of this check, usage frequency, and analysis results.

In step S140, the knowledge server 12 executes the analysis program corresponding to the selected config file on the application server 13. The knowledge server 12 acquires the analysis result obtained by the analysis performed by the application server 13 from the application server 13. The knowledge server 12 stores the analysis result in the knowledge DB 15 and discloses a report on the web, which includes a graph of the analysis result and the analysis subject comment.

Engineers who view this report determine the effectiveness of the analysis result and input data related to this effectiveness from the client server 14. In step S150, the knowledge server 12 acquires data related to this effectiveness, and determines whether or not the analysis result is effective. When the analysis result is effective, in step S160, the knowledge server 12 transmits the page data for the input screen for comment input to the client server 14, which displays this screen, receives the comments input by the engineer on this screen, and stores the information in the knowledge DB 15. In step S170, the knowledge server 12 receives the comments input from the engineers and stores these comments in the knowledge DB 16, after which this process ends.

When the navigation function is not selected in step S100 (NO) or when the analysis result is not effective in step S150 (NO), then, in step S180, the knowledge server 12 displays the analysis condition setting screen on the client server 14 and receives the data for each item (product type, data type, units and the like) of the analysis conditions set on the setting screen. In step S190, the knowledge server 12 displays the input screen for inputting analysis subject comments on the client server 14 and receives the analysis subject input on this input screen. In step S200, the knowledge server 12 determines whether or not to check the past config files in the knowledge DB 15. When a config file corresponding to the set conditions and analysis subject exists, the past config files having the highest analysis effectiveness and the past config files having the greatest frequency usage are listed. The config files are listed in ascending order of greatest usage frequency and effectiveness.

In step S210, when the engineer operates the client server 14 and has selected any of the selected config files (YES), then, in step S220, the knowledge server 12 executes the analysis program corresponding to the selected config file on the application server 13, and acquires the analysis result from the application server 13. The knowledge server 12 stores the analysis result in the knowledge DB 15 and discloses a report including an analysis result graph and the analysis subject comments on the web.

In step S230, the knowledge server 12 acquires the data related to effectiveness and determines whether or not the analysis result is effective. When the analysis result is effective (YES), the knowledge server 12 executes the process of step S160. However, when the analysis result is not effective (NO), the process returns to step S180.

When a config file corresponding to the set conditions and analysis subject does not exist in step S200 (NO), or when a listed file is not used in step S210 (NO), in step S240, the knowledge server 12 records a config file corresponding to the set conditions and analysis subject in the knowledge DB 15. In step S250, the knowledge server 12 organizes the information of the config file by means of the repository function. That is, the set conditions and analysis subject comments of the config file are organized for each engineering group. Thereafter, the processes of step S220 and subsequent steps are executed.

Figure 7A:
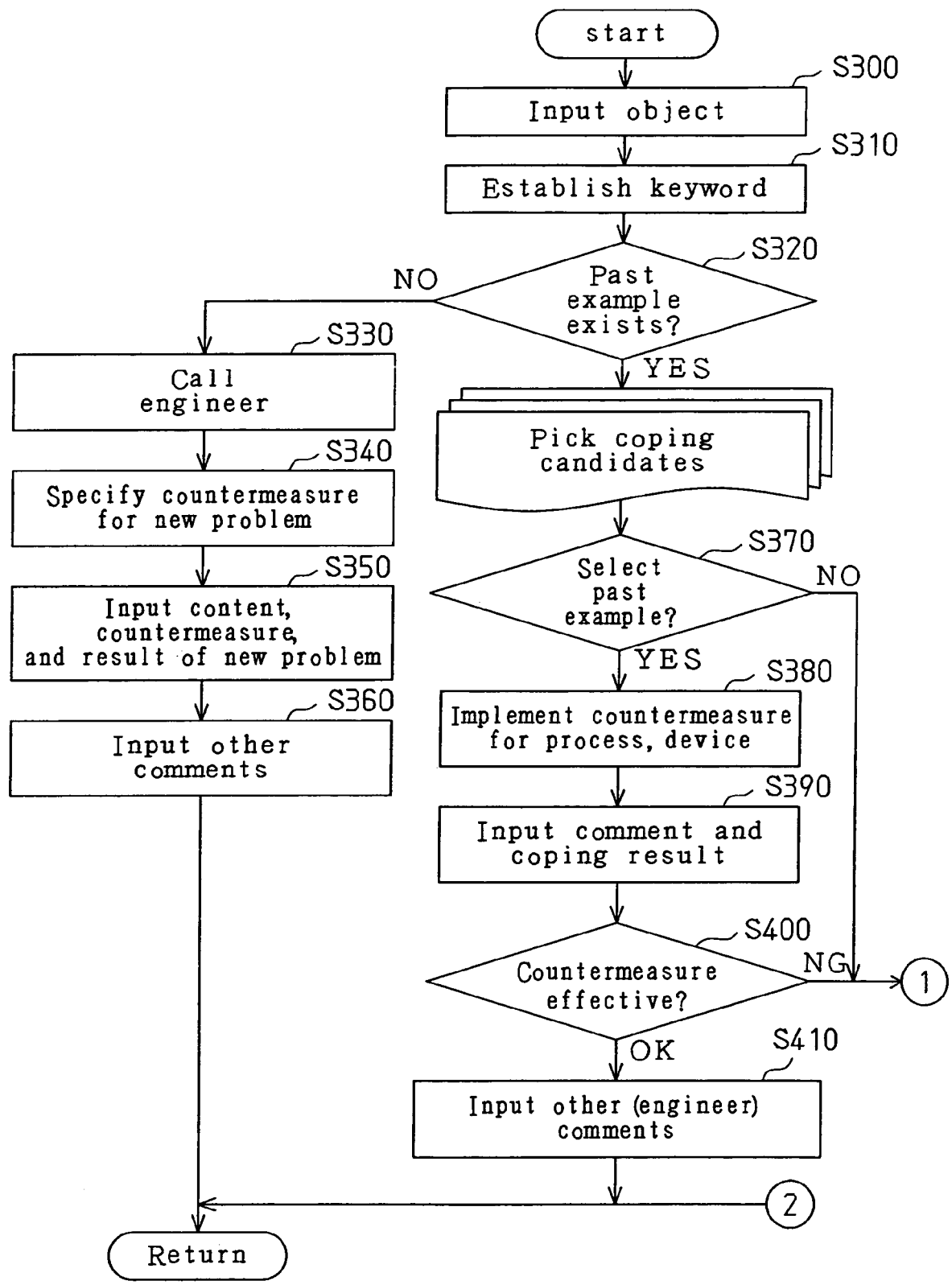
FIGS. 7A and 7B show a flowchart showing a problem coping process.
Figure 7B:
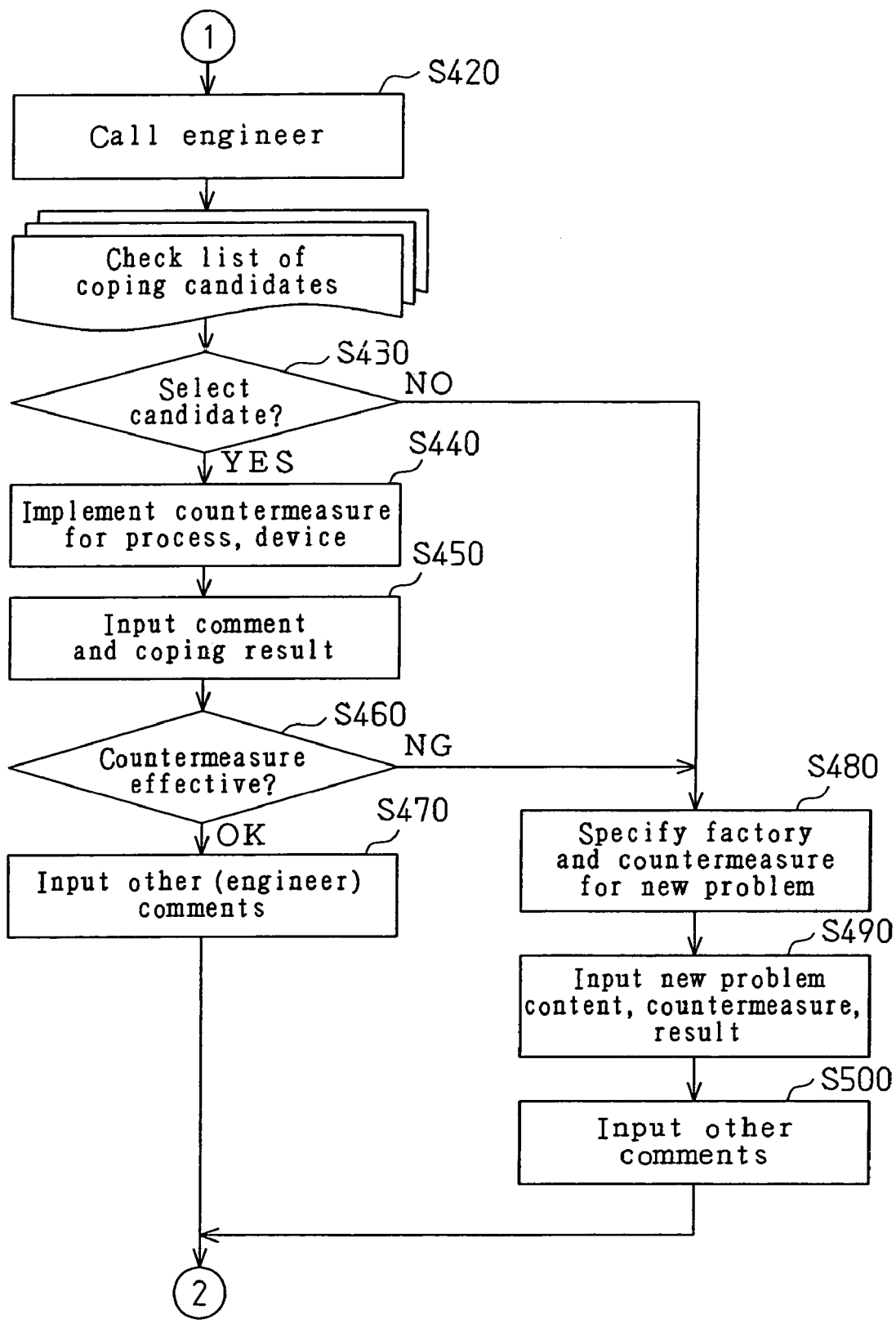

The problem coping process of FIGS. 7A and 7B will now be described. This process starts when an anomaly (alarm) occurs in the semiconductor manufacturing process and an operator accesses the main menu of the system 11 and selects an item corresponding to the existing problem.

First, in step S300, the knowledge server 12 transmits page data for the input screen of the analysis subject (name of process in which the problem occurred, name of device, problem condition and the like) to the client server 14, which displays this screen, and receives the analysis subject input on the input screen. In step S310, the knowledge server 12 establishes keywords, or extracts keywords in the input information of the analysis subject. For example, the input information is divided into phrases and words.

In step S320, the knowledge server 12 refers to the knowledge DB 15 and checks for the existence of past examples of successful coping results among past examples corresponding to the keywords. When there are no successful past examples, then, in step S230, the knowledge server 12 distributes the mail for requesting instructions for coping with the problem to the engineer and alerts the engineer. The engineer inputs the new problem coping method into the knowledge server 12. In step S340, the knowledge server 12 notifies the operator (at his system terminal) associated with the process in which the problem occurred of the input coping method. The operator performs the measures to eliminate the problem in accordance with the coping method in the notification. Thereafter, the operator inputs a coping result, which describes whether or not the problem was eliminated by the specified coping method.

In step S350, the knowledge server 12 stores the input coping information, which includes the new problem content, the coping method, and the coping result, as a past example in the knowledge DB 15. In step S360, the knowledge server 12 receives comments input by other engineers and ends the process after postscripting coping information as comments relating to the new problem.

When a past example exists in step S320 (YES), the knowledge server 12 extracts (picks up) candidates for coping information from the knowledge DB 15. In step S370, the knowledge server 12 determines whether or not the operator has selected any of the coping candidates. When the operator has selected a past example which was effective in eliminating the problem from among the coping candidates displayed in the list, in step S380, the knowledge server 12 instructs the use of the selected past example. Further, the coping measures for the process and device are implemented by the operator.

Thereafter, the operator inputs comments and coping results representing whether or not the problem was eliminated. Then, in step S390, the knowledge server 12 stores these coping results and comments in the knowledge DB 15.

In step S400, the knowledge server 12 determines whether or if the coping result input by the operator is successful (OK) and if the coping result is OK, the routine proceeds to step S410. Then, the comment from the engineer confirming the problem coping result is received over the web and the comment is stored in the knowledge DB 15 as problem coping information. In this way, the knowledge DB 15 is configured and strengthened by the experiences relating to problem coping.

When the operator has not selected a past example in step S370, or when the coping result is unsuccessful (NG) in step S400, then, in step S420, the knowledge server 12 distributes mail for requesting problem coping instructions to the engineer and alerts the engineer.

This time, the knowledge server 12 displays the list of coping candidates among the past examples. The engineer checks the coping candidates, and examines the applicability of the coping content. The coping candidates are listed in the order of past usage frequency or effectiveness. When the engineer selects any one of the coping candidates (step S430: YES), then, in step S440, the knowledge server 12 notifies the operator (system terminal) at a factory for the selected coping method, and the operator implements the countermeasures for the process and device in accordance with the coping method. Thereafter, the operator inputs comments and coping results describing whether or not the problem has been eliminated. In step S450, the knowledge server 12 stores the comments and coping result in the knowledge DB 15, and in step S460, determines whether or not the coping result was OK (successful). When the coping result is successful, then, in step S470, the knowledge server 12 receives the comments from another engineer who has confirmed the problem coping result. The comment is stored in the knowledge DB 15 as problem coping information. This ends the process.

When, however, a coping candidate is not selected in step S430 (NO), or when the coping result is unsuccessful (NG) in step S460, then, in step S480, the knowledge server 12 waits for the engineer to input a new problem coping method to the knowledge server 12. The knowledge server 12 notifies the operator (system terminal) at the factory about the input coping method. After the operator takes measures to eliminate the problem in accordance with the coping method in the notification, the operator inputs the coping result which describes whether or not the problem was eliminated.

In step S490, the knowledge server 12 stores the input coping information, which includes the new problem content, coping method, and coping result in the knowledge DB 15. In step S500, the knowledge server 500 receives the comment from the engineer confirming the coping result for the new problem, stores the comment in the knowledge DB 15 as a comment related to the new problem, and ends this process.

Figure 8:
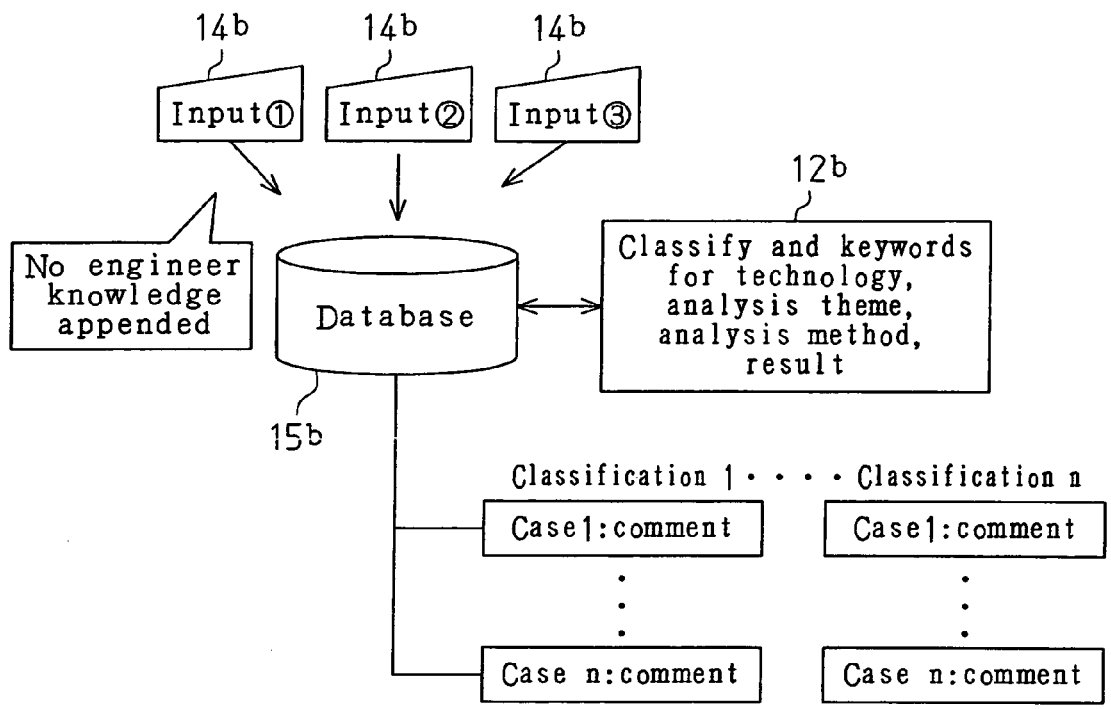
FIG. 8 is a diagram showing a conventional knowledge system.

The self-learning function of the knowledge DB 15 will now be described. FIG. 8 illustrates the storage and extraction of input information by a conventional quality improvement system (knowledge system).

As shown in FIG. 8, in a conventional knowledge system, comments by engineers related to individual analysis results are input from input terminals (client servers 14b). The knowledge server 12b classifies input information (comments) from the client servers 14b according to analysis theme, analysis method, and coping result, and extracts keywords and stores the keywords in the database 15b. The input information (comments) is not weighted, and is stored sequentially in the database 15b according to the order in which they are input. The input information (comments) is extracted from the database 15b based on the frequency of appearance of the keywords included in the input information (comments). That is, in the conventional system, the input information (comments) has a mutually parallel relationship.

Figure 9:
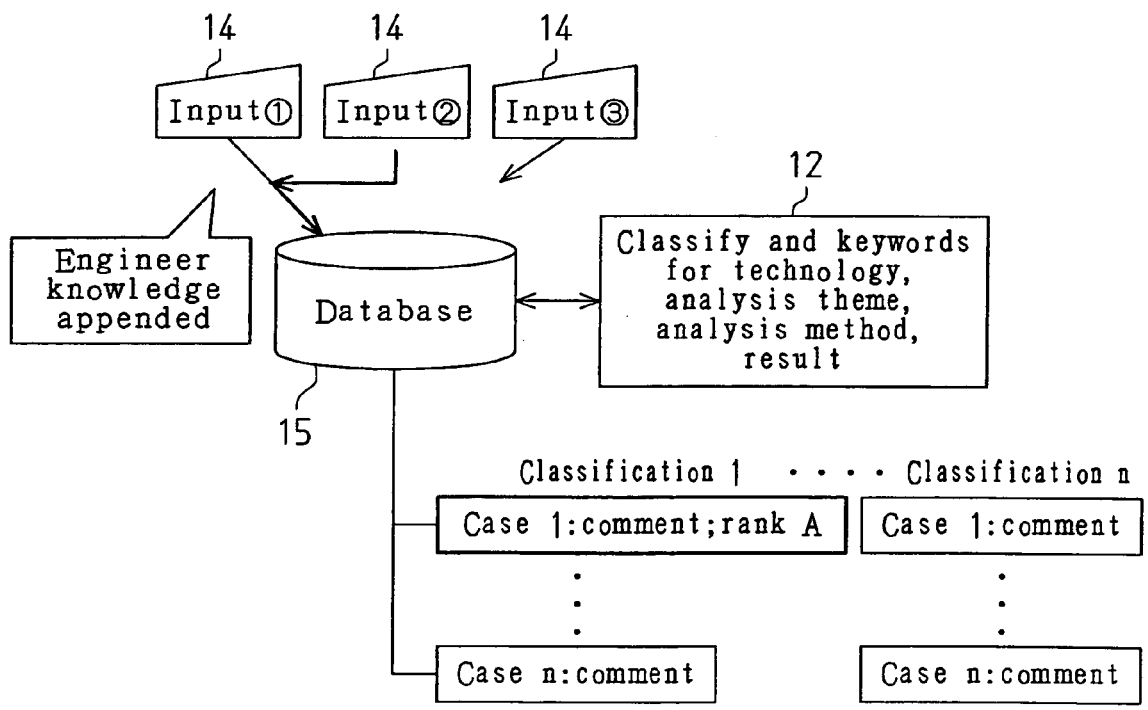
FIG. 9 is a diagram showing a knowledge system according to a preferred embodiment of the present invention.

FIG. 9 shows the storage and extraction of input information by the quality improvement system of the preferred embodiment (knowledge system). In contrast to the prior art shown in FIG. 8, in the quality improvement system 11, in regard to an analysis result (input information) input by a certain engineer by operating a first input terminal (client server 14), another engineer is able to postscript a comment (input information) from a second input device (client server 14). The knowledge server 12 classifies the input information from each client server 14 according to the technology, analysis theme, analysis method, and coping result, and extracts keywords, which are then stored in the database 15. A plurality of engineer comments, that is, opinions, are appended, and the input information is weighted for importance level and stored in the database 15. That is, the input information is ranked and registered in the database 15. In the quality improvement system 11, the weighted information, that is, the information which the engineer views as having high importance for quality improvement, is managed as stimulated information, and extracted on a prioritized basis from the database 15. In this way, input information is associated by the opinions of a plurality of engineers, and the degree of importance of the information is learned through this association before the fact and prior to classification of the individual information by keywords. The ranking of the comments matures (is established) according to the opinions of a plurality of engineers by repeating the association process. Therefore, the quality improvement system 11 organically intensifies the input information (knowledge expansion).

Figures 10, 11:
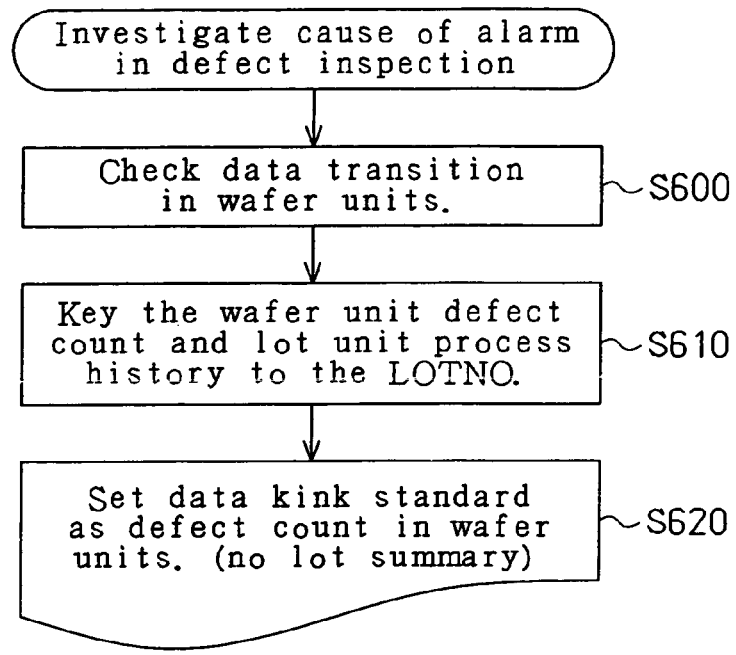
FIG. 10 is a diagram showing the flow of considerations when an alarm origin check is performed in a defect inspection process.
FIG. 11 is a diagram showing a data linking result.

FIG. 10 shows the flow of a deliberation process of the engineer when the cause of an anomaly occurring in the defect inspection process is checked by analyzing the correlation with a second data (the number of defects (defect count number) detected in the defect inspection process, and the manufacturing process history)).

In the semiconductor manufacturing process, a plurality of wafers (e.g., 10) are handled as one lot. The processing result of each processing device is managed for each lot (lot units). In the defect inspection process, the number of defects of a plurality of chips formed on each wafer are counted for each wafer (wafer units). Accordingly, when the correlation between the defect count number (number of individual defects) and the manufacturing process history is analyzed, data measured in mutually different units are linked and analyzed.

Specifically, an engineer first checks the data transition for each wafer obtained in the defect inspection process (step S600). The defect count number and the manufacturing process history of each lot are keyed to each lot number (LOTNO) (step S610). In step S620, data is arranged in accordance with the value of each lot, and the defect count number is managed for each wafer. That is, the defect count number is not the total number of defects for each lot (not a lot summary), but is the number of defects of each wafer. If analysis is performed based on the total number of defects per lot, the defect count number for each wafer becomes unknown, and the transition in the defect count number for each wafer cannot be determined. Therefore, in the preferred embodiment, the transition in the change in defects for each wafer in a plurality of processes is known by managing the defect count number for each wafer.

FIG. 11 shows linked data. The processing date, the manufacturing process, the processing device, the inspection process, the wafer number WFNO, and the defect inspection result (defect count number for each wafer) are recorded for the wafers of lot number LOTNO aaaaaaa-aa.

The data linking process performed by the quality improvement system 11 is described below using FIG. 12.

First, in step S650, the knowledge server 12 transmits the page data for the menu screen for defect analysis to the client server 14, which displays the menu screen. The engineer selects the items for correlation analysis and process history on the menu screen.

In step S660, the knowledge server 12 displays the condition setting screen for correlation analysis on the client server 14. The knowledge server 12 receives the setting data corresponding to each type of analysis condition (inspection process, manufacturing process, and the like) set by the engineer on the setting screen.

In step S670, the knowledge server 12 notifies the application server 13 of the setting data. The application server 13 starts the analysis program corresponding to the set conditions. The analysis program checks the data transition for each wafer in the defect inspection process, and keys the defect count number and manufacturing process history of each lot to the lot number (LOTNO).

Figure 13:
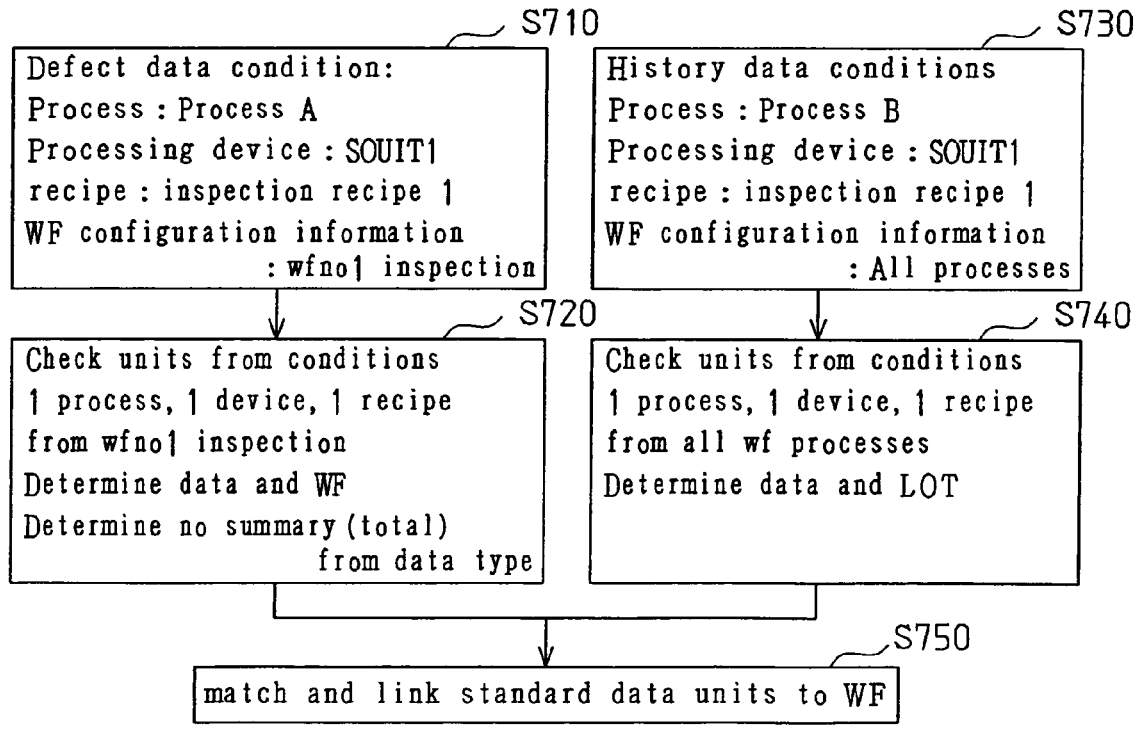
FIG. 13 is a diagram showing an automatic determination process for determining data units.

More specifically, the application server 13 reads various types of information, such as process, device, recipe, and wafer (WF), from the analysis subject data, and automatically determines the analysis data unit (per lot or per wafer) based on this information. As shown in FIG. 13, for example, in step S710, the application server 13 reads the defect analysis data conditions, which include process A as the process, SOUIT1 as the processing device, inspection recipe 1 as the recipe, and wfno1 inspection as the WF configuration information. In step S720, the application server 13 determines from the conditions when data pertain to values per wafer, that is, when the data units are WF units. Furthermore, the application server 13 determines when there is no summary (aggregate total) based on the data type.

In step S730, the application server 13 reads the conditions of the process history data, which include process B as the process, SOUIT2 as the processing device, process recipe 1 as the recipe, and the total number of processes as the WF configuration information. In step S740, the application server 13 determines from these conditions when the data pertains to values for each lot, that is, when the data units are lot units. In step S750, the application server 13 manages the data units and links the data such that the data become values per wafer based on the determination results of steps S720 and S740.

Figure 14:
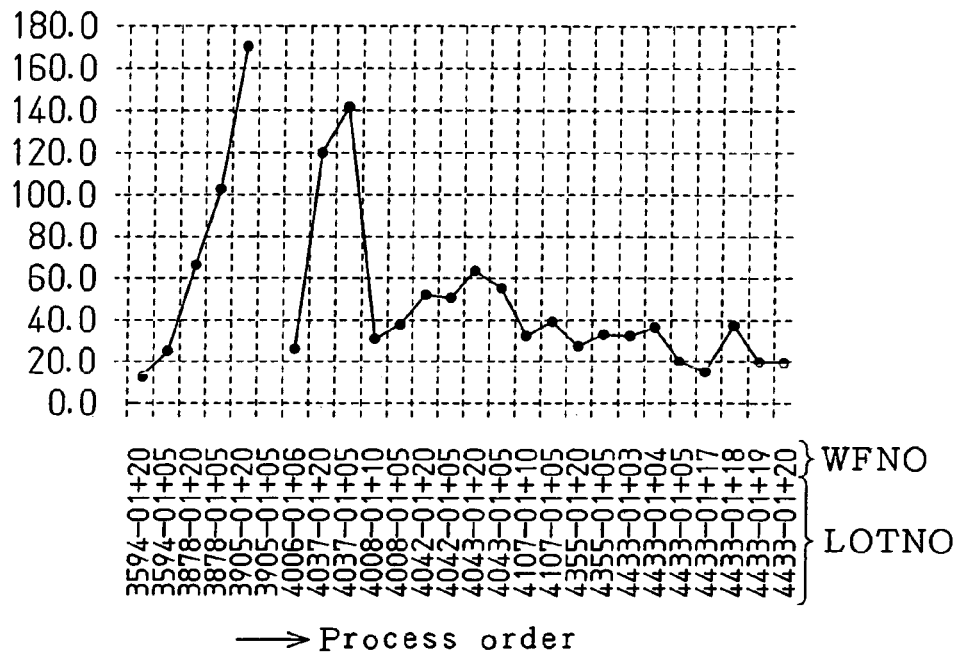
FIG. 14 is a diagram showing an example of an analysis graph.

The application server 13 links the data and prepares report data for displaying the analysis graph of FIG. 14. The vertical axis of the analysis graph represents the defect count number by processing device, and the horizontal axis represents the process order. The transition (trend) of the defect count number according to the process history is understood from this graph.

Figure 12:
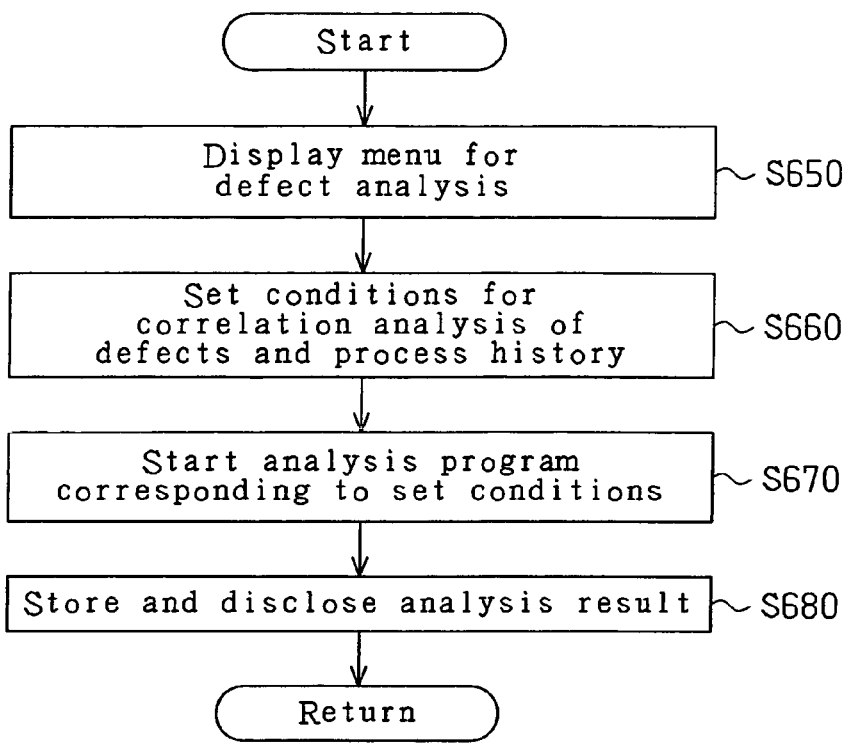
FIG. 12 is a flowchart showing a data linking process.

In step S680 of FIG. 12, the knowledge server 12 acquires report data from the analysis result, which includes the analysis graph and comments, from the application server 13, and stores the data in the knowledge DB 15. Based on the report data, the knowledge server 12 discloses the report, which includes the analysis graph and comments, on the web. The knowledge server 12 transmits the data (data such as the defect count number, process history and the like) used in the analysis to the client server 14, or prints out the report in accordance with the desire of the user.

In this way, when the process name and inspection process name are specified, the quality improvement system 11 extracts and processes the data required for analysis from the quality data in the plurality of processes separately managed by the plurality of external databases (DB) 18 so as to prepare trend graphs for the process order differentiated by device in the specified manufacturing process.

In the analysis graph of FIG. 14, the vertical axis is selectable in step S660. For example, in the analysis conditions of step S660, an analysis graph can be displayed in which the vertical axis is a selected item, by selecting technology data generated by the manufacturing history, such as yields, monitor characteristics, device inspection results, process management and the like.

Figure 15:
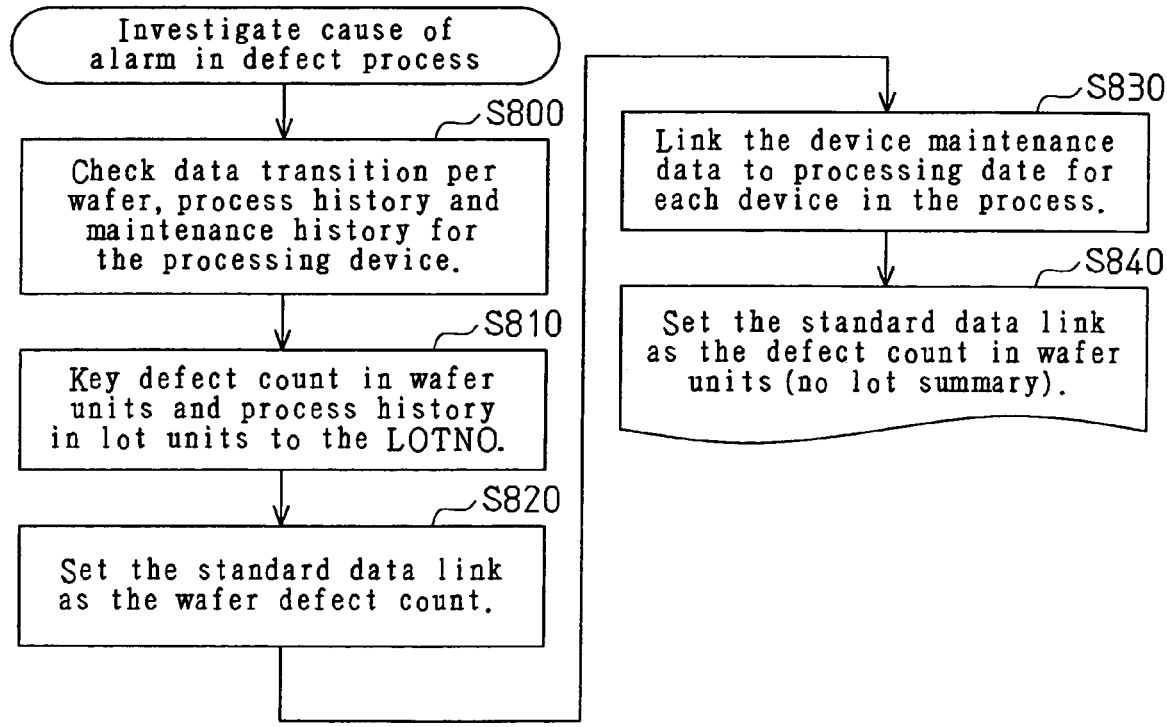
FIG. 15 is a diagram showing the flow of considerations when an alarm origin check is performed in the defect inspection process.

FIG. 15 shows the flow of the deliberation process for the engineer when the cause of an anomaly occurring in the defect inspection process is investigated by analyzing the correlation of three data items (defect count number, manufacturing process history data, maintenance data).

In step S800, the engineer checks the support history for the processing device recorded for each processing day, that is, the data transition for each wafer, processing history for each lot, and maintenance history for each device detected in the defect inspection process.

Figure 16:
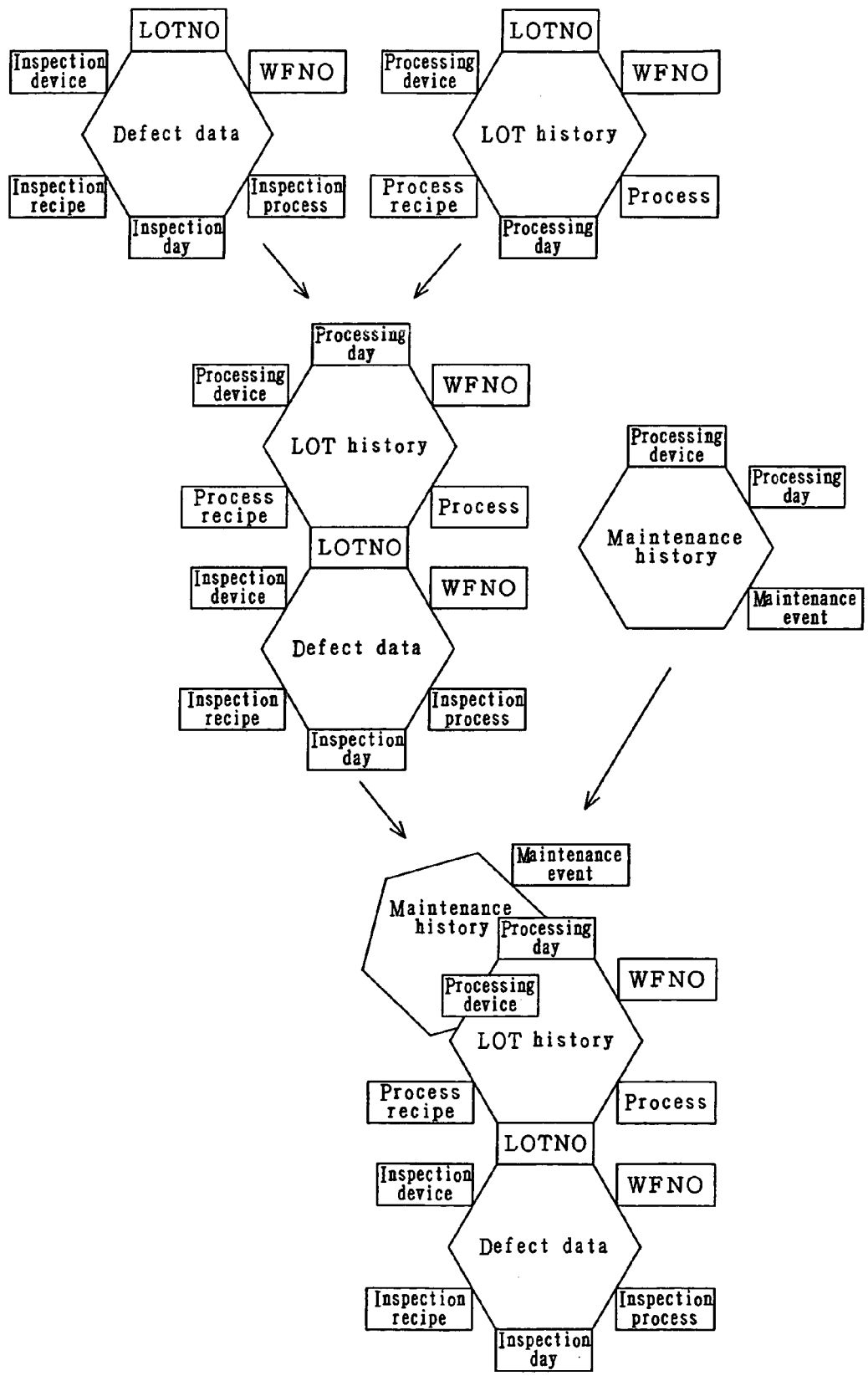
FIG. 16 is a diagram showing a data linking method.

As shown in FIG. 16, the defect data (defect count data) is managed by the defect management DB 18c associated with the lot number (LOTNO), the wafer number (WFNO), the inspection device, the inspection recipe, the inspection process, and the inspection date information. The processing history (LOT history) of each lot is associated with the lot number (LOTNO), wafer number (WFNO), processing device, processing recipe, process, and process date information, which are managed by the process management DB 18a. The maintenance history for processing devices associates the processing device, process date, and maintenance event information, which is managed by the device maintenance DB 18e.

In step S810, the application server 13 keys the defect count number of each wafer (defect data) and process history (LOT history) of each lot to the lot number (LOTNO). In step S820, the application server 13 uses each wafer as the standard for data linking, and counts the number of defects per wafer and does not count the total number of defects per lot (lot summary).

In step S830, the application server 13 links the maintenance data (maintenance history) based on processing data for each processing device. In step S840, the application server 13 counts the number of defects per wafer and does not total the number of defects per lot.

Figures 17, 18:
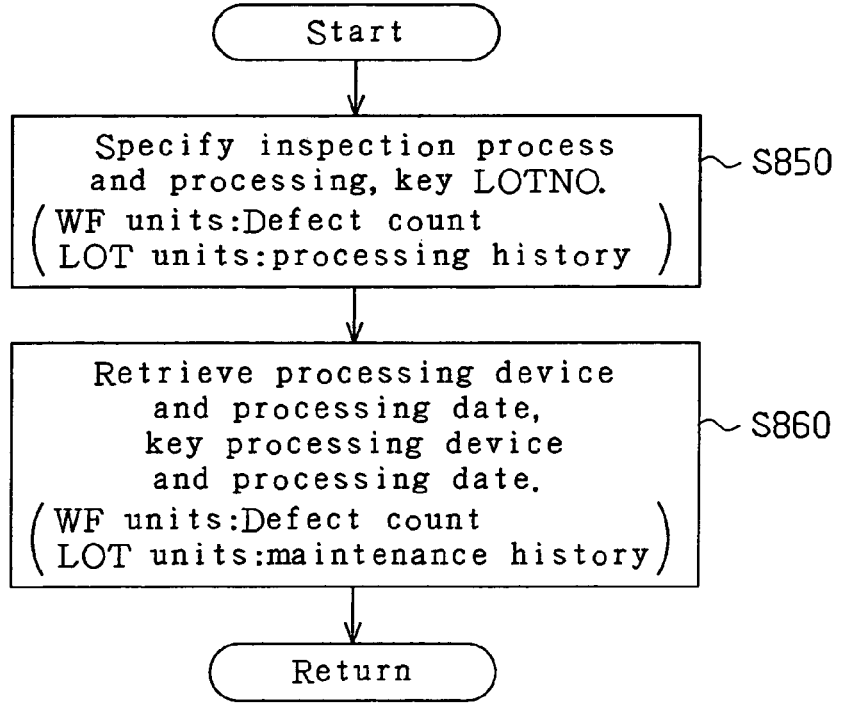
FIG. 17 is a diagram showing the data linking result.
FIG. 18 is a flowchart of the data linking process.

FIG. 17 shows an example of a data linking result. In FIG. 17, the processing data, manufacturing process, and processing device of a specific lot (lot number LOTNO=aaaaaaa-aa) is recorded for each of the five wafers having the wafer number (WFNO) 20. The defect inspection result (defect count number) for each wafer is recorded. Furthermore, the maintenance information for the processing device is recorded.

In the quality improvement system 11, processes (steps S650 through S680) identical to the analysis process of FIG. 12 are executed for correlation analysis of the previously mentioned three data items (defect count number, manufacturing process history, and maintenance history). The maintenance history is postscripted as an analysis condition set item in step S650, and the analysis program corresponding to this is started by the application server 13 in step S670.

Specifically, as shown in FIG. 18, the application server 13 designates the inspection process and manufacturing process, and keys the defect count number per wafer and manufacturing process history per lot to the lot number (LOTNO) (step S850). Thereafter, the application server 13 retrieves the processing device and processing date, and links the maintenance data (maintenance history) of each lot keyed to the processing device and processing date (step S860).

Figure 19:
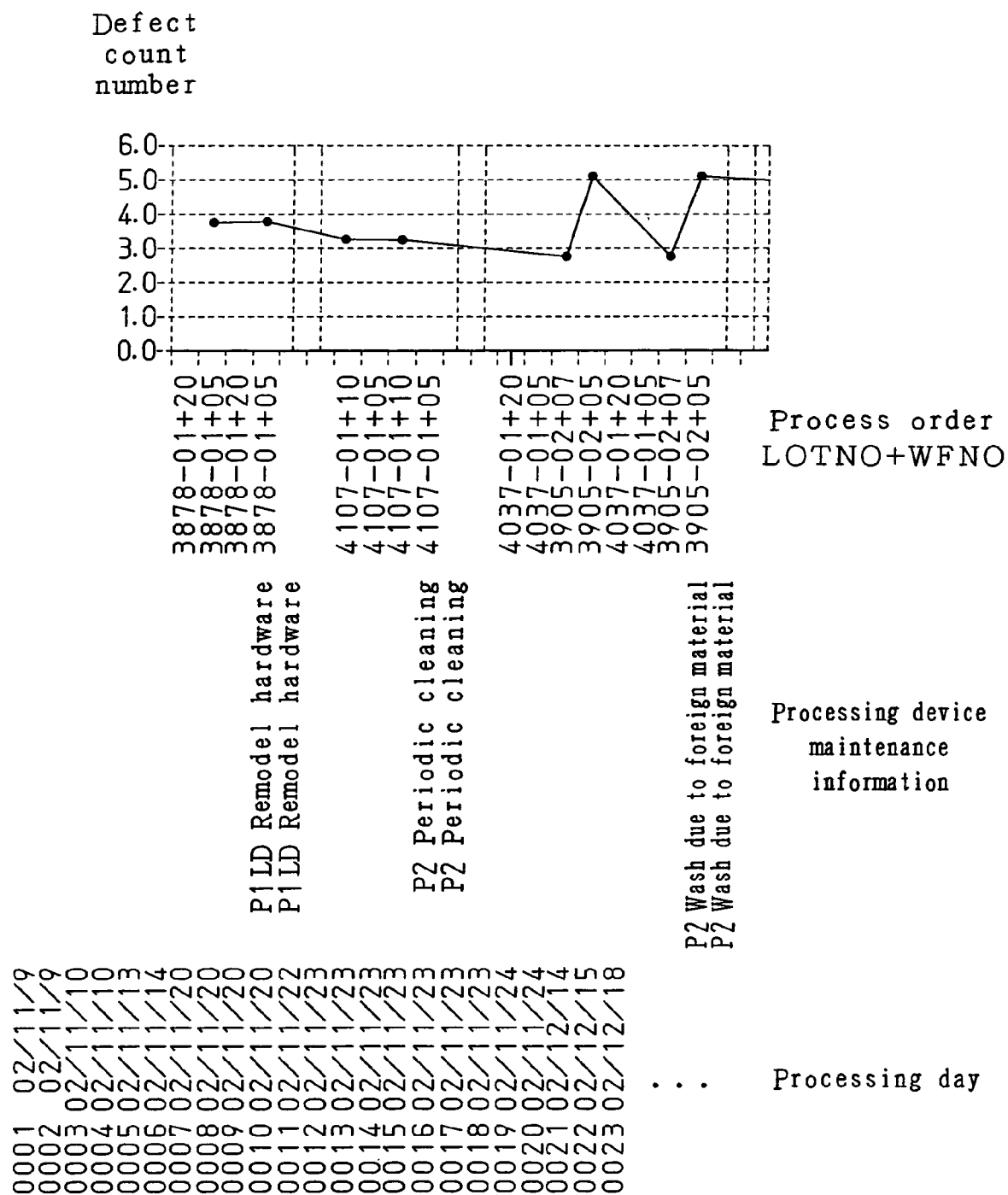
FIG. 19 is a diagram showing an example of an analysis graph.

As a result, report data is generated to display the analysis graph of FIG. 19. In this analysis graph, since the defect count number differentiated by device is displayed in the manufacturing process order, the transition (trend) of the defect count number corresponding to the process history is confirmed. Furthermore, the maintenance information of the processing device is associated with the processing date and displayed. In this way, it is possible to confirm the relationship between the maintenance history (maintenance information) and defect data, that is, the transition of the number of defects corresponding to the maintenance history. Even in the analysis graph of FIG. 19, technology data generated by the device history, such as yield, monitor characteristics, device inspection result, process management and the like, may be substituted for the defect count number on the vertical axis, and displayed.

Conversely, in the conventional art, a trend graph showing the relationship between the number of defects and the inspection day shown in FIG. 20A, and the documentation for the processing history of each lot shown in FIG. 20B, and the documentation for the maintenance history for each device shown in FIG. 20C are output separately from the respective management systems. Accordingly, the one graph and two documents are not mutually associated. Therefore, the engineer refers to the one graph and two documents and synthesizes the engineer deliberation process to analyze the correlations and attain a concept for quality improvement. In contrast, the quality improvement system of the present embodiment makes it possible for the engineer to easily attain a concept for quality improvement because the defect inspection data, lot processing history, and device maintenance history are mutually associated and displayed in a single graph, as shown in FIG. 21.

Figure 22:
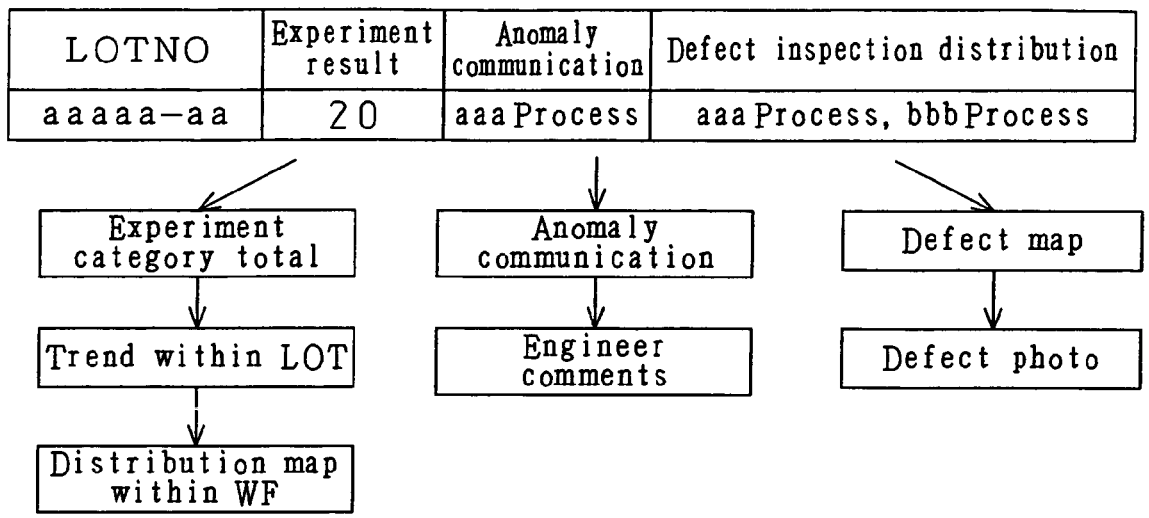
FIG. 22 is a diagram showing an analysis list.

FIG. 22 shows an example of an analysis list to show the lot experiment result. Specifically, the lot number (LOTNO)= aaaaa-aa, experiment result=20% yield, anomaly communication process=aaa process, defect inspection distribution=aaa process, and the bbb process are displayed. In the quality improvement system 11, the procedure is registered in the knowledge DB 15 to allow cooperative extraction of the experiment result graph, anomaly communication list, photographic images and the like from each item of the analysis list.

Specifically, when an item of the experiment result in the analysis list is selected, experiment result data are extracted from the experiment management DB 18b, and the aggregate experiment result graph for each category, trend graph within each lot, distribution map within the wafer and the like are displayed. When an item of the anomaly communication is selected, the data related to the anomaly communication is extracted from the anomaly communication DB 18d, and a report, which includes the defect inspection anomaly communication list and engineer comments, is displayed. When an item of the defect inspection distribution is selected, the defect information of the lot is extracted from the defect management DB 18c, and a defect map and defect photographic images (image data) are displayed. In this way, optional data is additionally selected from among the numerical value, graph and image data included in the quality data in accordance with the procedure recorded in the knowledge DB 15.

As described above, the preferred embodiment has the advantages described below.

(1) The quality improvement system 11 automatically executes analysis processes according to the deliberation process for engineers using quality data managed by a plurality of external databases 18 (18a through 18e). The quality improvement system 11 stores the knowledge of engineers, including comments on analysis results and analysis procedures performed by engineers in the past, in the knowledge DB 15. The quality improvement system 11 extracts information on the analysis procedure based on the frequency of additional comments (reference information) relating to an analysis result, and the frequency of occurrence of words included in the comments, and data related to the level of importance of the comments. Accordingly, various engineers easily use the analysis procedure having a high level of importance. In this way, the problem of skill differences among engineers is eliminated, and the efficiency of analysis work performed by engineers is improved by systematizing the method for quality improvement.

(2) In the quality improvement system 11, defect data obtained in the inspection process and history data of the manufacturing process managed in a separate database from that of the inspection process are used to prepare a trend graph for the quality data (FIG. 14). The change in the quality data in a plurality of processes is recognized by referring to the trend graph. This enables location of the manufacturing process causing the defects.

(3) The application server 13 automatically determines the units of the data being extracted and processed, arranges the data values in smaller units (changes lot units to wafer units), and links the different data. In this way, the units of the data for extraction and processing is determined in the same manner as the determination method of the engineer deliberation process. Furthermore, the trend graph of the quality data can be associated with any item among the processing procedure, manufacturing process, and processing device, and displayed.

(4) The definition file is easily prepared since the definition file containing the analysis procedure information can be prepared according to a drill down type setting screen (FIG. 4).

(5) The opinions of the engineers are intensified in the knowledge DB 15. In particular, many comments pertaining to analysis results determined to be important by a plurality of engineers may be accessed. Therefore, the importance level of the analysis result may be determined by managing the comment order (association) and number of postscripted comments (frequency of additions). The result content of successful examples and unsuccessful examples may be separately selected. The process order having the greatest effectiveness and most frequent comments can be extracted on a prioritized basis from the knowledge DB 15. In this way knowledge server 12 self-learns the opinions of the engineers in the knowledge DB 15 by managing the frequency of written comments, the order of comments, and the result content.

(6) Analysis results for quality improvement are stored in the knowledge DB 15 differentiated by analysis subject, and the knowledge of engineers pertaining to quality improvement is organically intensified (knowledge expansion). In this way, the process procedure for quality improvement and differentiated by analysis subject can be navigated by the operator.

(7) If a problem occurring in a process or device is similar to a past problem, the quality improvement system 11 automatically specifies the countermeasures for eliminating the problem to the operator of the process or device. However, when a new problem occurs, the quality improvement system 11 notifies an engineer about the problem. That is, since the engineer is only notified of the new problem, the engineer can concentrate on coping with the new problem. In this way, the work efficiency of the engineer is improved, and lot release and processing device release are accomplished in a short time. As a result, engineer resources (analysis time and personnel) are used effectively.

(8) Since past examples of analysis processes and problem countermeasures are used reliably in the quality improvement system 11, wasteful replication of similar analysis investigations by different engineers is avoided.

It should be apparent to those skilled in the art that the present invention may be embodied in many other specific forms without departing from the spirit or scope of the invention. Particularly, it should be understood that the present invention may be embodied in the following forms.

Figure 23:
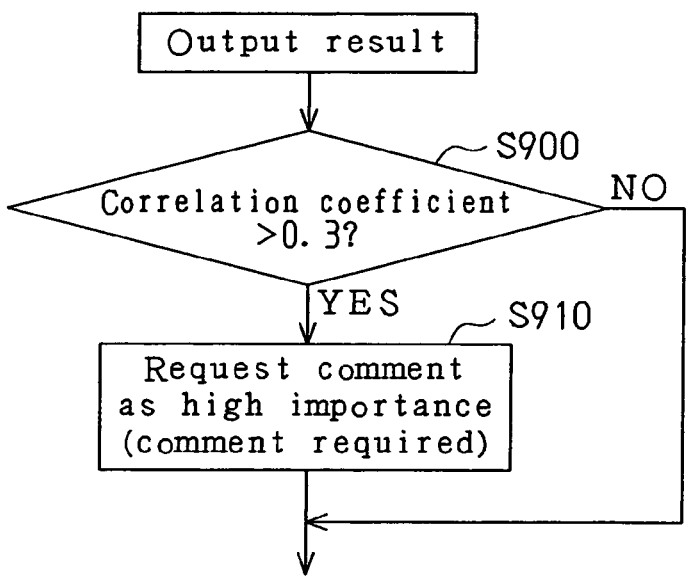
FIG. 23 is a diagram illustrating a comment input according to a further embodiment of the present invention.

As shown in FIG. 23, the input of comments related to analysis results may be stimulated among engineers in accordance with the degree of correlation in the analysis graph (FIG. 14). For example, in step S900, the knowledge server 12 determines whether or not the correlation coefficient between data on the X-axis and the Y-axis in the analysis graph is greater than a predetermined value (e.g., 0.3). When the correlation coefficient is greater than a predetermined value, then, in step S910, the knowledge server 12 determines when the correlation coefficient of the analysis result is high and the analysis result has a high degree of importance and requests comment input from the engineers. However, when the correlation coefficient is less than a predetermined value, the knowledge server 12 determines that the analysis result has low importance and skips step S910. The level of importance of the analysis result can be automatically determined using a coefficient (e.g., a determining coefficient that is obtained by squaring the correlation coefficient) other than the correlation coefficient when determining whether or not to request comment from the engineers.

Figure 24:
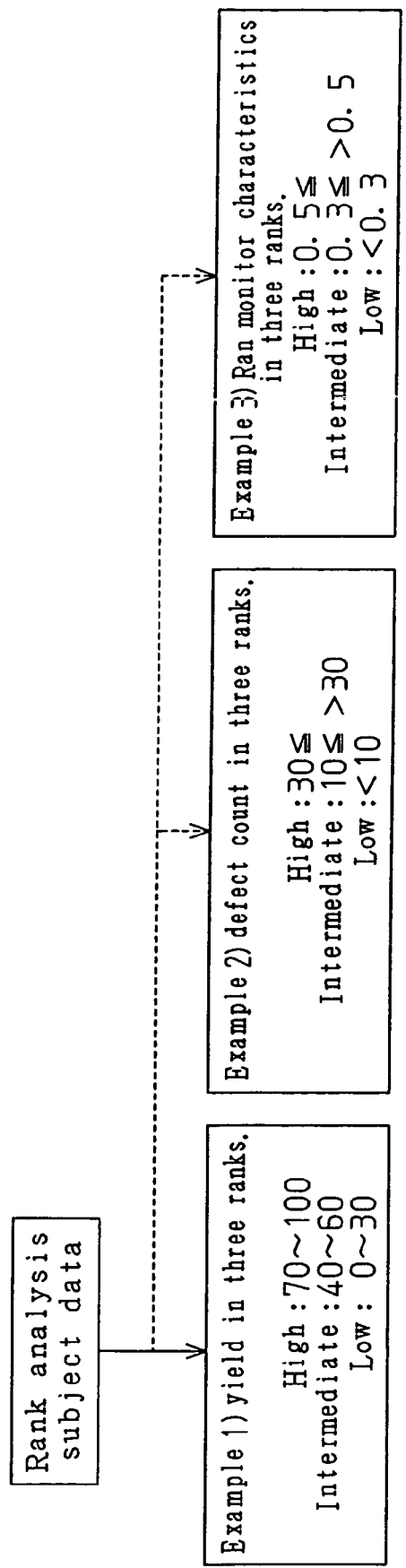
FIG. 24 is a diagram illustrating a comment input according to a further embodiment of the present invention.

As shown in FIG. 24, the analysis results may be ranked based on the magnitude relationship of the analysis subject data, and a plurality of comment boxes corresponding to the ranking may be provided to request comments. For example, when the analysis result data pertains to yield, yield can be divided into three ranks of high (70 to 100%), intermediate (40 to 60%), and low (0 to 30%), and comment boxes corresponding to the three ranks may be provided. When the analysis subject data are defect numbers, the individual defect numbers may be divided into three ranks of high (30 or more), intermediate (10 or more but less than 30), and low (less than 10), and comment boxes corresponding to the three ranks may be provided. When the analysis subject data are monitor characteristics using a threshold voltage Vth; the threshold voltage Vth may be divided into three ranks of high (0.5 V or higher), intermediate (0.3 V or higher but less than 0.5 V), and low (less than 0.3 V), and comment boxes corresponding to the three ranks may be provided. The analysis results are managed according to the analysis result rankings, and when used as a past example, the analysis list is prepared based on the ranking. In this case, analysis results are accurately extracted according to rankings, which is desirable for practical use.

Although the data are ordered by values per wafer when data linking in the preferred embodiment, other values such as values per chamber of N sheets or per batch (disk, furnace) may be used.

The present examples and embodiments are to be considered as illustrative and not restrictive, and the invention is not to be limited to the details given herein, but may be modified within the scope and equivalence of the appended claims.

What is claimed is:

1. A quality improvement system, connected to an input device and external databases for storing quality data obtained through manufacturing processes, the quality improvement system comprising:

a knowledge use processing device including a storage device for storing analysis procedure information; and a data processing device for acquiring analysis subject data from the plurality of external databases according to the analysis procedure, analyzing the analysis subject, and generating an analysis result;

wherein the knowledge use processing device is operable for:

appending engineer comments relating to the analysis result, the engineer comments being input from the input device and stored in the storage device;

determining the level of importance of the engineer comments, and extracting suitable analysis procedure information in accordance with the level of importance from the storage device;

determining whether specific conditions are met when a problem occurs in the manufacturing processes, the specific conditions including:
(i) there is no successful past example coping with said problem in the storage device;
(ii) an operator engaged in the manufacturing processes does not select a past example coping with said problem among candidates coping with said problem; and
(iii) a coping result in which a past example selected by an operator engaged in the manufacturing processes among the candidates coping with said problem is unsuccessful;

alerting when at least one of the specific conditions is met; and determining and outputting a countermeasure for coping with said problem when none of the specific conditions are met.

2. The quality improvement system of claim 1, wherein during the manufacture of a semiconductor product, the external databases store the quality data, obtained through manufacturing processes of the semiconductor product for each manufacturing process, and wherein the quality improvement system uses the quality data to improve the quality of the semiconductor product.

3. The quality improvement system of claim 1, wherein the knowledge use processing device extracts the quantity of engineer comments appended to the analysis result, the frequency of occurrence of words included in the engineer comments, and the analysis procedure information from the storage device in accordance with the level of importance.

4. The quality improvement system of claim 1, wherein the data processing device extracts data required for analysis from the quality data stored in the plurality of external databases in accordance with the specified manufacturing process name and inspection process name, and generates a trend graph representing transition of a value of the quality data in accordance with a value in accordance with a process order for each device in the specified manufacturing process.

5. The quality improvement system of claim 4, wherein the data processing device automatically determines the unit of the data required for the analysis, and links data required for analysis after arranging the value of each data in smaller data units.

6. The quality improvement system of claim 1, wherein the quality improvement system uses the quality data to improve the quality of a semiconductor product, and wherein the data processing device processes the quality data based on one of the process order, manufacturing process, or processing device of the semiconductor product, and generates a trend graph for the quality data.

7. The quality improvement system of claim 1, wherein the storage device registers a numerical value of the quality data, a graph of the analysis data, and a procedure for processing each image of the analysis data, and the knowledge use processing device processes one selected from the numerical value of the quality data, the graph of the analysis information, and the image of the analysis information in accordance with the procedure.

8. The quality improvement system of claim 1, wherein the knowledge use processing device displays a drill down type condition setting screen on the input device, and generates a definition file of the analysis procedure on the input device.

9. The quality improvement system of claim 1, wherein the engineer comments includes a comment appended to a problem coping result and a comment appended to the analysis result, the knowledge use processing device stores the appended comments in the storage device, and the knowledge use processing device extracts on a prioritized basis coping procedures having high effectiveness and coping procedures to which many comments are appended.

10. The quality improvement system of claim 1, wherein the engineer comments includes comments appended to the analysis result, the storage device includes a knowledge database, and the knowledge use processing device associates the analysis result with the number of comments appended to the analysis result, the order of the comments, and the contents of the comments, and stores the information in the knowledge database.

11. The quality improvement system of claim 10, wherein the knowledge use processing device stores the analysis results in the knowledge database differentiated by analysis objective and is configured to allow navigation of the processing procedure for quality improvement in accordance with the analysis objective.

12. The quality improvement system of claim 1, wherein the knowledge use processing device automatically performs a problem coping process and analysis process for quality improvement based on information stored in the storage device.

13. The quality improvement system of claim 1, wherein the data processing device is an application server for extracting data and executing a program; and
the knowledge use processing device is a knowledge server for disclosing an input analysis condition and the analysis result on the web and storing engineer comments related to the analysis result in the knowledge database.

14. The quality improvement system of claim 13, wherein the quality improvement system uses the quality data to improve the quality of a semiconductor product, and wherein the knowledge server manages a group of users permitted access to the engineer comments stored in the knowledge database in accordance with the technology of the semiconductor product and the type of analysis.

15. The quality improvement system of claim 13, wherein the engineer comments includes important data for the analysis result and comments formed by a plurality of words, and the knowledge server includes a repository database for referring to the important data and the frequency of occurrence of words in the comments.

16. A method for improving the quality of a semiconductor product manufactured in a plurality of semiconductor product manufacturing processes, the method comprising:
storing quality data for the semiconductor product obtained during the plurality of semiconductor manufacturing processes in each of a plurality of external databases;
using a knowledge server including a program for analyzing the quality data to cause an application server to acquire the quality data from the external databases and analyze the quality data in accordance with the program;
storing engineer comments input from an input device and relating to an analysis result generated by the application server, in a repository database with the knowledge server;
self-learning by referring to the repository database with the knowledge server; and
determining whether specific conditions are met when a problem occurs in the manufacturing processes, the specific conditions including:
  (i) there is no successful past example coping with said problem in the storage device;
  (ii) an operator engaged in the manufacturing processes does not select a past example coping with said problem among candidates coping with said problem; and
  (iii) a coping result in which a past example selected by an operator engaged in the manufacturing processes among the candidates coping with said problem is unsuccessful;
alerting when at least one of the specific conditions is met; and
determining and outputting a countermeasure for coping with said problem when none of the specific conditions are met.

17. The method of claim 16, wherein said self-learning process includes storing the analysis result in the repository database with the knowledge server.

18. The method of claim 16, wherein the engineer comments includes weighted information representing importance of the analysis result.

19. A quality improvement system, connected to an input device and external databases for storing quality data obtained through manufacturing processes, the quality improvement system comprising:
a knowledge use processing device including a storage device for storing analysis procedure information, the knowledge use processing device,
appending engineer comments input from the input device and relating to an analysis result;

determining a level of importance of the engineer comments, and extracting suitable analysis procedure information in accordance with the level of importance from the storage device; and determining whether specific conditions are met when a problem occurs in the manufacturing processes, the specific conditions including:
- (i) there is no successful past example coping with said problem in the storage device;
- (ii) an operator engaged in the manufacturing processes does not select a past example coping with said problem among candidates coping with said problem; and
- (iii) a coping result in which a past example selected by an operator engaged in the manufacturing processes among the candidates coping with said problem is unsuccessful;

alerting when at least one of the specific conditions is met; and determining and outputting a countermeasure for coping with said problem when none of the specific conditions are met.

* * * * *